US007120565B1

(12) United States Patent
Shibazaki

(10) Patent No.: US 7,120,565 B1
(45) Date of Patent: Oct. 10, 2006

(54) METHOD AND APPARATUS FOR DETERMINING FIGURE

(75) Inventor: Mitsuhiro Shibazaki, Tokyo (JP)

(73) Assignee: Chemical Grouting Company, Ltd., Tokyo (JP)

( * ) Notice: Subject to any disclaimer, the term of this patent is extended or adjusted under 35 U.S.C. 154(b) by 790 days.

(21) Appl. No.: 09/671,740

(22) Filed: Sep. 29, 2000

(30) Foreign Application Priority Data

Oct. 1, 1999 (JP) ................................. 11-281096

(51) Int. Cl.
- *G05B 19/18* (2006.01)
- *E21B 4/00* (2006.01)
- *E21B 47/00* (2006.01)

(52) U.S. Cl. .................. 703/2; 73/152; 73/47; 73/587; 175/329; 175/416; 175/91; 175/106

(58) Field of Classification Search .................. 703/10, 703/2; 175/353, 416, 329, 91, 106; 73/152.47, 73/587

See application file for complete search history.

(56) References Cited

U.S. PATENT DOCUMENTS

| | | | | |
|---|---|---|---|---|
| 3,599,736 | A | * | 8/1971 | Thompson .................. 175/434 |
| 4,074,778 | A | * | 2/1978 | Morrell et al. ................. 175/91 |
| 4,114,486 | A | * | 9/1978 | Hooker .......................... 82/12 |
| 4,333,368 | A | * | 6/1982 | Watt ............................. 82/1.11 |
| 4,738,322 | A | * | 4/1988 | Hall et al. .................. 175/371 |
| 4,763,736 | A | * | 8/1988 | Varel, Sr. .................... 175/341 |
| 5,695,018 | A | * | 12/1997 | Pessier et al. ............... 175/331 |
| 5,864,058 | A | * | 1/1999 | Chen ........................ 73/152.47 |
| 5,996,713 | A | * | 12/1999 | Pessier et al. ............... 175/353 |

FOREIGN PATENT DOCUMENTS

JP          06-304805     * 11/1994

OTHER PUBLICATIONS

Spirograph (David P. Little, math.dartmouth.edu, 1997.*
Aarnout Brombacher, Using Computers in Mathematics Instruction, 1997.*
Ma, The Operational Mechanics of The Rock Bit, Petroleum Press, 1996.*
Xah Lee, A Visual Dictionary of Famous Plan Curves, 1998.*
Eric W. weisstein, Spirograph, mathworld, 1999.*
Tomer Shiran, Kids Rule, Spirograph, http://accessarts.org/artKids/spirograph, 1997.*
Oliver Kerr, X2 Applied Mathematics, Sep. 11, 1998.*
Xah Lee, A Visual Dictionary of Famous Plane Curves, 1995-1998.*

* cited by examiner

*Primary Examiner*—Ramesh Patel
*Assistant Examiner*—Sunray Chang
(74) *Attorney, Agent, or Firm*—Westerman, Hattori, Daniels & Adrian, LLP.

(57) ABSTRACT

The present invention aims to provide apparatus and method for determining non-circular figure to drill boring holes having a regular N-polygonal cross sections while retaining the advantage of the turning operation. For boring a boring hole (H) with a cross-sectional shape of a regular N-polygon having vertexes of N in number, a boring tool (T) having a cross-sectional shape of a regular (N−1)-polygon which is inscribed on the regular N-polygon of the boring hole is driven to rotate at a certain rotational speed around its center (G) and revolve at a certain revolving speed along a circle (R) which is concentric to the boring hole center (O) and has a certain radius. The boring tool (T) may be replaced with a jet of fluid. A boring tool (T) with a regular (N+1)-polygonal contour may be used instead.

4 Claims, 25 Drawing Sheets

(N=4)

$$f(t) = \left|\cos\frac{N}{2}t\right|$$

METHOD AND APPARATUS FOR DETERMINING FIGURE

DETAILED EXPLANATION OF THE INVENTION

1. Field of the Invention

The present invention relates to a method and apparatus for determining a figure such as a regular N-polygon at a practical accuracy of engineering without the accurate measurement of lengths or angles.

2. Prior Art

In the excavation of a boring hole, for example, the most effective manner of boring is to rotate the drill bit, and in this case the resulting boring hole has a circular cross-sectional shape naturally. However, if it is possible to bore a boring hole having a quadrilateral cross-sectional shape, the boring step would be efficient with regard to the quantity of removed soil.

In reforming foundations, for example, the boring step for boring holes, each of which has a circular cross-sectional shape, generates many overlapping sections inherently, whereas the boring step for boring holes having a hexagonal cross-sectional shape can cut the entire work surface without such the overlapping section.

Besides the civil engineering works mentioned above, there are various advantages in applying non-circular figures in the machining, designing, and other engineering fields.

At the application of this concept to the engineering, it has been necessary for the conventional techniques to measure lengths or angles accurately in determining non-circular figures. It has been a costly labor-demanding work to carry out the high-accuracy measurement of lengths or angles for the determination of figures in various engineering works or at various sites of civil engineering.

In other words, there is not available at the present stage a scheme of determining non-circular figures without the need of the accurate measurement of lengths or angles.

SUMMARY OF THE INVENTION

In view of the above-mentioned situation, it is an object of the present invention to provide a method and apparatus for determining a figure capable of determining a figure of non-circular cross-sectional-shape, particularly a regular polygonal figure, without the accurate measurement of lengths or angles.

The inventor of the present invention has found the following technical contents as a result of studies.

(A) Assuming a plane on which there are the sun S, earth E and moon M, the sun S is located at the center as a first point, the earth E is as a second point which revolves around the first point and the moon M is as a third point which revolves around the second point, with the moon M which is distant by $(N-1)^2 r$ from the earth E revolving around the earth at an angular velocity $\omega$ and the earth E which is distant by r from the sun S revolving around the sun at an angular velocity $(1-N)\omega$, in case that the sun S is seen as a fixed point, the locus of the moon M approximates to a contour of a regular N-polygonal curve which is circumscribed on a circle having a radius $N(N-2)r$.

(B) In case that a regular (N−1)-polygon which is inscribed on a circle having a radius $(N-1)^2 r$ rotates around its center axis at an angular velocity $\omega$ and revolves along a circle having a radius r at an angular velocity $(1-N)\omega$, an area being swept by the said regular (N−1)-polygon defines an area, a contour of which approximates to a regular N-polygonal curve being circumscribed on a circle having a radius of $N(N-2)r$.

(C) In case that a regular (N+1) polygon, which is inscribed on a circle having a radius $(N+1)^2 r$, rotates around its center axis at an angular velocity $\omega$ and revolves along a circle having a radius r at an angular velocity $(N+1)\omega$, an area being swept by the said regular (N+1) polygon defines an are, a contour of which approximates to a regular N-polygonal curve being circumscribed on a circle having a radius of $N(N+2)r$.

In the above-mentioned technical contents and the following description, a positive and negative signs attached to the angular velocity signify rotations in opposite directions.

CONSTRUCTIONAL ELEMENTS OF THE INVENTION

The present invention is derived from the above-mentioned technical contents.

In the figure determining method of the present invention for determining a regular N-polygonal figure having vertexes of N in number, characterized in that:

the center point (S) of a regular N-polygonal figure to be determined is set as a fixed point;

a point, which is distant by a certain length from the said center point (S) and revolves around the center point (S), is set as a first point (E);

a point, which is distant by a certain length from the first point (E) and revolves around the first point (E), is set as a second point (M); and assuming that the second point (M) revolves around the first point (E) at an angular velocity $\omega$, that the first point (E) revolves around the center point (S) at an angular velocity $(1-N)\omega$, that the first point (E) is away from the center point (S) by a distance (r), and that the second point (M) is away from the first point (E) by a distance $(N-1)^2 r$, the locus of the second point (M) defines a contour of a regular N-polygonal figure to be determined being circumscribed on a circle having a radius $N(N-2)r$.

According to the present invention constructed as mentioned above, a boring hole having a cross-sectional shape of a regular N-polygon can be bored based on the above-mentioned content (A). The fixed center point corresponds to the sun (S) in the content (A). The first point, which is away from the said center point by a certain distance and revolves around the said center point, corresponds to the earth E. The second point, which is away from the said first point by a certain distance and revolves around the first point, corresponds to the moon M.

The locus of the second point (moon M) defines the contour of the regular N-polygon as mentioned in the content (A).

Furthermore, the figure determining method of the present invention for determining a regular N-polygonal figure having vertexes of N in number, characterized in that:

a regular (N−1)-polygonal figure revolves along a circle, which circle is concentric to the center of a regular N-polygonal figure to be determined and has a radius r, and rotates at an angular velocity $\omega$;

a contour of the said regular (N−1)-polygonal figure is inscribed on a circle having a radius $(N-1)^2 r$;

the regular (N−1)-polygonal figure revolves at an angular velocity $(1-N)\omega$; and an area being swept by the said regular (N−1)-polygonal figure defines a regular N-polygonal figure to be determined, which figure is circumscribed on a circle having a radius N(N−2)r.

According to the boring scheme based on the present invention constructed as mentioned above, a regular N-polygonal figure can be determined based on the above-mentioned content (B). The area being swept (and/or passed) by the said regular (N−1)-polygonal figure defines a range of a regular N-polygonal shape which is circumscribed on a circle having a radius N(N−2)r.

Furthermore, the figure determining method of the present invention for determining a regular N-polygonal figure having vertexes of N in number, characterized in that:

a regular (N+1)-polygonal figure revolves along a circle, which circle is concentric to the center of a regular N-polygonal figure to be determined and has a radius r, and rotates at an angular velocity ω;

a contour of the said regular (N+1)-polygonal figure is inscribed on a circle having a radius $(N+1)^2 r$;

the regular (N+1)-polygonal figure revolves at an angular velocity (N+1)ω; and an area being swept by the said regular (N+1)-polygonal figure defines a regular N-polygonal figure to be determined, which figure is circumscribed on a circle having a radius N(N+2)r.

According to the figure determining method of the present invention constructed as mentioned above, based on the above-mentioned content (C), the area being swept by the said regular (N+1)-polygonal figure defines such the regular N-polygonal figure which is circumscribed on a circle having a radius N(N+2)r.

In the present invention, a bored boring hole has a cross-sectional shape which is constructed by the envelope resulting from the eccentric rotation, and therefore, each vertex is rounded and each side is not exactly linear. However, the cross-sectional shape of a boring hole, which is bored by the present invention, is approved practically to be a regular N-polygon without a problem. The term "regular N-polygon" is used in this sense throughout this specification.

In carrying out the present invention, such the regular N-polygonal figure can be determined by using a figure, which is defined by steps for:

setting a start point being revolved along a circle which is concentric to the center of the regular N-polygonal figure to be determined and has a radius r;

placing line segments of N in number, each of which extends in radius direction, at a constant interval from the said start point in the circumference direction; and positioning the end point of each of the line segment on a circle having a radius $(N−1)^2 r$, the said end point is opposite side to the said start point.

Upon using such the regular N-polygonal figure, the said line segments revolve around the start point at an angular velocity ω, the start point revolves around the center of the regular N-polygonal figure at an angular velocity (1−N)ω, the start point is away from the center of the regular N-polygonal figure by the distance (r), and the length of each of the line segment is $(N−1)^2 r$, so that the locus of the end point, which is opposite side to the said start point, of the said line segment defines a regular N-polygonal figure to be determined which is circumscribed on a circle having a radius N(N−2)r.

According to the above-mentioned constructions, a regular N-polygonal figure is determined based on the above-mentioned content (A). Specifically, the center of a regular N-polygonal figure to be determined corresponds to the sun S mentioned in the content (A), the said start point corresponds to the earth E, and the said end point, which is on opposite side to the said start point, of each of the line segment corresponds to the moon M. The locus of the said end point being on the opposite side to the said start point define a contour of a regular N-polygon as mentioned in the content (A).

In carrying out the present invention, it is possible to use a figure such the regular (N−1)-polygonal figure, which is defined by steps for:

setting a start point being revolved along a circle which is concentric to the center of the regular N-polygonal figure to be determined and has a radius r;

placing line segments of N in number, each of which extends in radius direction, at a constant interval from the said start point in the circumference direction; and positioning the end point of each of the line segment on a circle having a radius $(N−1)^2 r$, the said end point is opposite side to the said start point.

In the above-mentioned case, an area being swept by the said line segments, each of which extends in radius direction and is placed at a constant interval in a circumference direction, corresponds to the area being swept by the regular (N−1)-polygonal figure, as mentioned in the content (B), and therefore, a regular N-polygonal figure is determined.

The above-mentioned method of the present invention determines a regular N-polygonal figure, in which each side between adjacent vertexes being (substantially) linear.

There is a case in which it is intended to increase the circumferential length of cross section (the length of cross-sectional contour) relative to the cross-sectional area, as in the case of determining a cross-sectional shape of a friction pit for example.

In order to attain such a requirement, the inventor of the present has found, as a result of studies, that:

by making a ratio of the radial distance r between the center point (fixed point) and the first point to the distance between the first point and the second point, in other words, a ratio of the distance (r) between the start point and the center of the regular N-polygonal figure to the length of the line segments, is smaller than $(N−1)^2$, the second point or the point on the side opposite to the line segment start point defines a shape which has vertexes of N in number and is a single closed region formed by curves (arcuate curves being convex against the center axis of boring hole).

Based on this technical content, by means of the figure determining method of the present invention as described below, it is possible to determine a figure which has sides between vertexes formed by arcuate curves (arcuate curves which is convex inwardly) and has a shape with a long circumferential length relative to the cross-sectional area.

Namely, the figure determining method of the present invention comprises steps for:

setting a fixed center point;

setting a first point which is away from the center point by a certain length and revolves around the center point;

setting a second point which is away from the first point by a certain length and revolves around the first point;

setting an angular velocity ω at which the second point revolves around the first point;

setting at an angular velocity (1−N)ω at which the first point revolves around the center point;

setting a distance between the first point and the center point as a distance r;

setting a ratio of the distance between the center point and the first point to the length of a line segment connecting the first and second points being smaller than $(N-1)^2$; and defining a figure to be determined by the locus of the second point, which figure has vertexes of N in number, is circumscribed on a circle having a radius $N(N-2)r$, and is a single closed region formed by curves.

Alternatively, in carrying out this invention, it is possible to use a figure, which is defined by steps for:

setting a start point being revolved along a circle which is concentric to the center of the regular N-polygonal figure to be determined and has a radius r;

placing line segments of N in number, each of which extends in radius direction, at a constant interval from the said start point in the circumference direction; and positioning the end point of each of the line segment on a circle having a radius $(N-1)^2 r$, the said end point is opposite side to the said start point.

And then, it is possible to comprise following steps for:

revolving the said line segments around the start point at an angular velocity ω;

revolving the start point around the center of the regular N-polygonal figure at an angular velocity $(1-N)$ ω;

setting a distance between the start point and the center of the regular N-polygonal figure as a distance r; and setting a ratio of the distance (r) between the start point and the center of the regular N-polygonal figure to the length of the line segments being smaller than $(N-1)^2$.

Furthermore, the inventor of the present invention has found, as a result of studies, that by making the above-described ratio much smaller, it is possible to determine a figure which is made up of a plurality of closed regions formed by curves and is symmetric with respect to the center point.

Namely, the figure determining method of the present invention comprises following steps for:

setting a fixed center point;

setting a first point being away from the center point by a certain length and revolving around the center point;

setting a second point being away from the first point by a certain length and revolving around the first point;

setting an angular velocity ω at which the second point revolves around the first point;

setting an angular velocity $(1-N)$ ω at which the first point revolves around the center point;

setting a distance between the first point and the center point as a distance r;

setting a ratio of the distance between the center point and the first point to the length of a line segment, which connects the first and second points, being smaller than $(N-1)^2$; and defining a figure to be determined by the locus of the second point, which figure is made up of a plurality of closed regions formed by curves and is symmetric with respect to the center (of the figure to be determined).

In this invention, it is possible to use a figure, which is defined by steps for:

setting a start point being revolved along a circle which is concentric to the center of the regular N-polygonal figure to be determined and has a radius r;

placing line segments of N in number, each of which extends in radius direction, at a constant interval from the said start point in the circumference direction; and positioning the end point of each of the line segment on a circle having a radius $(N-1)^2 r$, the said end point is opposite side to the said start point.

And then, it is possible to comprise following steps for:

revolving the said line segments around the start point at an angular velocity ω;

revolving the start point around the center of the regular N-polygonal figure at an angular velocity $(1-N)$ ω;

setting a distance between the start point and the center of the regular N-polygonal figure as a distance r; and setting a ratio of the distance (r) between the start point and the center of the regular N-polygonal figure to the length of the line segments being smaller than $(N-1)^2$.

The phrase "which figure is made up of a plurality of closed regions formed by curves and is symmetric with respect to the center" means a daisy-like figure having N closed regions as shown in FIGS. 32–37. In case the number of closed regions is N+1, such the phrase means a daisy-like figure as shown in FIG. 54.

The figure determining apparatus of the present invention for carrying out the above-mentioned figure determining method are constructed as follows.

The figure determining apparatus of the present invention, which apparatus determines a regular N-polygonal figure having vertexes of N in number, characterized in that the said apparatus includes an input means and a control means, the said input means is constructed to carry out functions for:

setting a center point of a regular N-polygonal figure to be determined as a fixed point;

setting a first point which is away from the center point by a certain length and revolves around the center point;

setting a second point which is away from the first point by a certain length and revolves around the first point;

setting an angular velocity ω at which the second point revolves around the first point;

setting an angular velocity $(1-N)$ ω at which the first point revolves around the center point;

setting a distance r between the first point and the center point; and setting a distance $(N-1)^2 r$ between the second point and the first point: and that the said control means is constructed so as to carry out functions for defining a regular N-polygonal figure to be determined by the locus of the second point, which figure is circumscribed on a circle having a radius $N(N-2)r$.

The figure determining apparatus of the present invention being constructed as mentioned above was invented by applying the above-described content (A) to a figure determining apparatus.

Furthermore, the figure determining apparatus of the present invention, which apparatus determines a regular N-polygonal figure having vertexes of N in number, characterized in that the said apparatus includes an input means and a control means, the said input means is constructed to carry out functions for:

inputting so as to revolve a regular (N-1)-polygonal figure along a circle, which circle is concentric to the center of a regular N-polygonal figure to be determined and has a radius r;

inputting so as to rotate such the regular (N-1)-polygonal figure at an angular velocity ω;

setting the regular (N-1)-polygonal figure so as to define a contour which is inscribed on a circle having a radius $(N-1)^2 r$; and setting an angular velocity $(1-N)$ ω at which the regular (N-1)-polygonal figure revolves: and that the said control means is constructed to carry out a function for defining a regular N-polygonal figure to be determined, which is circumscribed on a circle having a radius N(N−2)r, by an area being swept by the regular (N−1)-polygonal figure.

The figure determining apparatus of the present invention being constructed as mentioned above is based on the above-described content (B).

For the value of N, an integer except for 4 can be set. Of course, N may be set 4.

Furthermore, the figure determining apparatus of the present invention, which apparatus determines a regular N-polygonal figure having vertexes of N in number, characterized in that the said apparatus includes an input means and a control means, the said input means is constructed to carry out functions for:

inputting so as to revolve a regular (N+1)-polygonal figure along a circle, which circle is concentric to the center of a regular N-polygonal figure to be determined and has a radius r;

inputting so as to rotate such the regular (N+1)-polygonal figure at an angular velocity $\omega$;

setting the regular (N+1)-polygonal figure so as to define a contour which is inscribed on a circle having a radius $(N+1)^2 r$; and setting an angular velocity (N+1) $\omega$ at which the regular (N+1)-polygonal figure revolves: and that the said control means is constructed to carry out a function for defining a regular N-polygonal figure to be determined, which is circumscribed on a circle having a radius N(N+2)r, by an area being swept by the regular (N+1)-polygonal figure.

The figure determining apparatus being constructed as mentioned above is based on the above-described content (C).

In case it is desired to increase the circumferential length of cross section (the length of cross-sectional contour) relative to the cross-sectional area, for example in the case of a friction pit, the apparatus of this invention can include an input means and a control means. In this case, the said input means is constructed to carry out functions for:

setting a center point as a fixed point;

setting a first point which is away from the center point by a certain length and revolves around the center point;

setting a second point which is away from the first point by a certain length and revolves around the first point;

setting an angular velocity $\omega$ at which the second point revolves around the first point;

setting an angular velocity (1−N) $\omega$ at which the first point revolves around the center point;

setting a distance r between the first point and the center point;

setting a ratio of the distance between the center point and the first point to the length of a line segment, which connects the first and second points, being smaller than $(N−1)^2$: and the said control means is constructed to carry out a function for defining a figure to be determined by the locus of the second point, which figure has vertexes of N in number, is circumscribed on a circle having a radius N(N−2)r, and is a single closed region formed by curves.

In this case, it is possible to use a figure which is defined by steps for:

setting a start point revolving along a circle which is concentric to the center of the regular N-polygonal figure to be determined and has a radius r;

placing line segments of N in number, each of which extends in radius direction, at a constant interval from the said start point in the circumference direction; and positioning the end point of each of the line segment on a circle having a radius $(N−1)^2 r$, the said endpoint is opposite side to the said start point.

And then, it is possible to constructed so that:

the said line segments revolve around the start point at an angular velocity $\omega$;

an angular velocity (1−N) $\omega$ is set at which angular velocity the start point revolves around the center of the regular N-polygonal figure;

a distance between the start point and the center of the regular N-polygonal figure is set as a distance r; and a ratio of the distance (r) between the start point and the center of the regular N-polygonal figure to the length of the line segments is set so as to be smaller than $(N−1)^2$.

Furthermore, according to the present invention, it is possible to determine a figure being made up of closed regions of N in number, each of which regions is contoured by curves and is symmetric with respect to the center.

Namely, in the present invention, it is possible to include an input means and a control means, the said input means is constructed to carry out functions for:

setting a center point as a fixed point;

setting a first point which is away from the center point by a certain length and revolves around the center point;

setting a second point which is away from the first point by a certain length and revolves around the first point;

setting an angular velocity $\omega$ at which the second point revolve around the first point;

setting an angular velocity (1−N) $\omega$ at which the first point revolves around the center point;

setting a distance r between the first and the center point; and setting a ratio of the distance between the center point and the first point to the length of a line segment, which connects the first and second points, being smaller than $(N−1)^2$: and the said control means is constructed to carry out a function for defining a figure to be determined by the locus of the second point, which figure is made up of a plurality of closed regions formed by curves and is symmetric with respect to the center (of the figure to be determined).

Also, in this invention, it is possible to use a figure which is defined by steps for:

setting a start point revolving along a circle which is concentric to the center of the regular N-polygonal figure to be determined and has a radius r;

placing line segments of N in number, each of which extends in radius direction, at a constant interval from the said start point in the circumference direction; and positioning the end point of each of the line segment on a circle having a radius $(N−1)^2 r$, the said end point is opposite side to the said start point.

And then, in this invention, it is possible to constructed so that:

the said line segments revolve around the start point at an angular velocity $\omega$;

an angular velocity (1−N) $\omega$ is set at which angular velocity the start point revolves around the center of the regular N-polygonal figure;

a distance between the start point and the center of the regular N-polygonal figure is set as a distance r; and a ratio of the distance (r) between the start point and the center of the regular N-polygonal figure to the length of the line segments is set so as to be smaller than $(N−1)^2$.

The "figure being made up of closed regions of N in number, each of which regions is contoured by curves and is symmetric with respect to the center" signifies a daisy-like figure having N closed regions as shown in FIG. 32 through FIG. 37. In case the number of closed regions is N+1, the "figure being made up of closed regions of N in number, each of which regions is contoured by curves and is symmetric with respect to the center" signifies a daisy-like figure as shown in FIG. 54.

PRINCIPLE OF THE INVENTION

Initially, the principle of operation of the present invention will be explained with reference to FIG. 41 through FIG. 55.

First, the case of N=4, i.e. the determination of a square, will be dealt with. In FIG. 41, it is assumed that a point E (it corresponds to the earth) revolves around the origin S (it corresponds to the sun), and a point M (it corresponds to the moon) revolves around the point E (earth).

In FIG. 41, if the distance between the point S and point E (the radius of revolution of the point E) is r, the distance between the point E and point M is L (it is written as $\lambda$ in the figure), the angular velocity of the point M is $\omega$, and the coordinates of the point M is $(x_M, y_M)$, then the distance $L_M$ between the point S and point M is expressed by the following formula.

$$L_M = (x_M^2 + y_M^2)^{1/2} \tag{1}$$
$$= [\{L\cos\omega t + r\cos(-3)\omega t\}^2 + \{L\sin\omega t + r\sin(-3)\omega t\}^2]^{1/2}$$
$$= (r^2 + L^3 + 2rL \cdot \cos 4\omega t)^{1/2}$$

The time needed for the point $M(x_M, y_M)$, i.e., the end point (moon) of the line segment SM, to revolve once thereby to draw a square is given by $t=2\pi/\omega$, and during this time period, the point $E(x_E, y_E)$ (earth) rotates three times.

The system of motion including the points S, E and M will be dealt with in more detail with reference to FIG. 42.

In FIG. 42, the distance between the point E and point M is L (it is written as $\lambda$ in the figure), and L is equal to $\eta r$ ($\eta$ is a constant): (term of condition). The point E has an angular velocity $\kappa\omega$ ($\kappa$ is a constant).

In FIG. 42, the coordinates of the point M are given as follows.

$$x_M = r\cos\kappa\omega t + \eta r\cos\omega t \tag{2}$$

$$y_M = r\sin\kappa\omega t + \eta r\sin\omega t \tag{3}$$

The matter in question here is only the shape of figure, and starting the motion of the point E and point M specifically at the mid point of one side of the regular N-polygonal figure at $\omega t=0$ does not loose the generality. Accordingly, initial conditions are set as shown in FIG. 43.

Regarding the mid point of side PQ as being located on the X axis and $\omega t$, being $\theta$ as shown in FIG. 43, the above formulas (2) and (3) are reformed as follows.

$$x_M = \eta r\cos\theta + r\cos(\kappa\theta + \pi) \tag{4}$$
$$= \eta r\cos\theta - r\cos\kappa\theta$$

$$y_M = \eta r\sin\theta + r\sin(\kappa\theta + \pi) \tag{5}$$
$$= \eta r\sin\theta = r\sin\kappa\theta$$

By using the formulas (2) and (3) with respect to the motion of the point M against the point S, the distance $L_M$ between the point S and point M is expressed by the following formula.

$$L_M = (X_M^2 + y_M^2)^{1/2} \tag{6}$$
$$= \{(\eta r\cos\theta - r\cos\kappa\theta)^2 + (\eta r\sin\theta - r\sin\kappa\theta)^2\}^{1/2}$$
$$= \{\cos^2\kappa\theta + \sin^2\kappa\theta + \eta(\cos^2\theta + \sin^2\theta) - 2\eta(\cos\theta\cos\kappa\theta + \sin\theta\sin\kappa\theta)\}^{1/2}$$
$$= r\{1 + \eta^2 - 2\eta\cos(1-\kappa)\theta\}^{1/2}$$

In order for the locus of the point M to be a regular N-polygonal figure, the variation of the center angle during the movement from the first vertex $M_1$ to the next vertex $M_2$ is $2\pi/N$. The point E moves from $E_1$ to $E_2$ in FIG. 44, and it is a variation of $2\pi-(2\pi/N)$ in terms of the center angle.

The point M advances by a center angle of $2\pi/N$ at time t, i.e., $2\pi/N=\omega t$, then:

$$t=(1/\omega)(2\pi/N) \tag{7}$$

Whereas, the point E advances by $-\{2\pi-(2\pi/N)\}$ at time t, and it is equal to $\kappa\omega t$, then:

$$t=(2\pi/\kappa\omega)(N-1/N) \tag{8}$$

The formulas (5) and (6) give:

$$\kappa=1-N \tag{9}$$

explains the principle of operation of the determination of a regular N-polygonal figure.

Prior to the determination of a regular N-polygonal figure, a regular N-polygonal curve $f(\theta)$ is defined as follows.

(a) $f(\theta)$ is a one-valued function.

(b) $f(\theta)$ is a periodic function with a period $2\pi/N$.

(c) $f(\theta)$ has one maximum value and one minimum value in one period.

(d) In regard to one period from a maximum point to the next maximum point of $f(\theta)$, $f(\theta)$ has line symmetry with respect to the center of the minimum point between the two maximum points.

(e) $f(\theta)$ has a positive curvature or no curvature, and it must be zero at the minimum point of $f(\theta)$.

In addition, one side of the figure to be determined is nearly linear provided that the polarity of curvature of the side does not change at the intersection of the side with the X axis or Y axis, i.e., the mid point of the side. In other words, an additional condition is that the value of the second-order derivative of the equation of the curve which represents the side is zero at the mid point.

This condition means that the mid point of one side of the regular N-polygonal figure to be determined is an inflection point. Namely, in FIG. 45, the mid point M of the line segment PMQ (which is one side of the regular N-polygonal figure to be determined) needs to be an inflection point.

Formulas (4) and (5) give: $x=\eta r\cos\theta-r\cos\kappa\theta$ and $y=\eta r\sin\theta-r\sin\kappa\theta$.

When the mid point M of the line segment PMQ is an inflection point, the following condition must be met at the point M.

$$d^2x/dy^2=0 \tag{10}$$

The first-order derivatives of the formulas (4) and (5) are obtained based on the separation of variables as: $dx=(-\eta r\sin\theta+\kappa r\sin\kappa\theta)d\theta$ and $dy_M=(\eta r\cos\theta-\kappa r\cos\kappa\theta)d\theta$.

They give:

$$(dx/dy)=(-\eta r\sin\theta+\kappa r\sin\kappa\theta)/(\eta r\cos\theta-\kappa r\cos\kappa\theta) \tag{11}$$

And:

$$(d^2x/dy^2) = (d/dy)\{(-\eta r\sin\theta + \kappa r\sin\kappa\theta)/(\eta r\cos\theta - \kappa r\cos\kappa\theta)\} \quad (12)$$

$$= (d\theta/dy)(d/d\theta)\{(-\eta r\sin\theta + \kappa r\sin\kappa\theta)/(\eta r\cos\theta - \kappa r\sin\kappa\theta)\}$$

$$= \{1/(\eta\cos\theta - \kappa\cos\kappa\theta)\}(d/d\theta)\{(-\eta\sin\theta + \kappa\sin\kappa\theta)/(\eta\cos\theta - \kappa\cos\kappa\theta)\}$$

$$= \{(\eta\cos\theta - \kappa\cos\kappa\theta)(-\eta\cos\theta + \kappa^2\cos\kappa\theta) - (-\eta\sin\theta + \kappa\sin\kappa\theta)(-\eta\sin\theta + \kappa^2\sin\kappa\theta)\}/\{(\eta\cos\theta - \kappa\cos\kappa\theta)(\eta\cos\theta - \kappa\cos\kappa\theta)^2\}$$

Providing the condition $d^2x/dy^2=0$ for the formula (12) at $\theta=0$ gives:

$$d^2x/dy^2|_{\theta=0} = \{(\eta-\kappa)(\kappa^2-\eta)\}/\{(\eta-\kappa)(\eta-\kappa)^2\} \quad (13)$$

$$= (\kappa^2 - \eta)/(\eta-\kappa)^2 = 0$$

Formula (13) gives:

$$\eta = \kappa^2 \quad (14)$$

Reforming $L=\eta r$ (term of condition) by using the formula (14) gives: $L=\kappa^2 r$.

Using the formula (9) gives:

$$L = (N-1)^2 r \quad (15)$$

When the condition of the formula (15) is met, each side of the regular N-polygonal figure to be determined becomes most linear.

Using the formula (15) to rewrite the formulas (4) and (5) gives:

$$x = r\{(1-N)^2\cos\omega t - \cos(1-N)\omega t\} \quad (16)$$

$$y = r\{(1-N)^2\sin\omega t - \sin(1-N)\omega t\} \quad (17)$$

The above-mentioned pertains to the principle of operation of the determination of a regular N-polygonal figure from the line segment EM shown in FIG. 42 for example. The following explains with reference to FIG. 46 that a regular N-polygonal figure can be determined by rotating a regular (N−1)-polygonal figure.

In FIG. 46, the point M is turned by an amount of 2π/(N−1) from point M1 to point M2.

Assuming the point E and point M1 being located at time t=0 as shown in FIG. 46 does not loose the generality. The point E and point M1 at time t=0 have their coordinates given with reference to the formula (15) and so on as: E(r,0) and M1({(N−1)²−1}r,0).

The coordinates (x1,y1) of the point M1 is expressed as: $x1 = r\{(1-N)^2\cos\omega t - \cos(1-N)\omega t\}$: (refer to formula (16)), and $y1 = r\{(1-N)^2\sin\omega t - \sin(1-N)\omega t\}$: (refer to formula (17)).

The locus of the point M1 becomes the shape of a regular N-polygonal figure. In FIG. 46, if the locus of the point M2 coincides with the locus of the point M1, it can be proved that all vertexes of a regular (N−1)-polygon determine a regular N-polygonal figure.

In other words, if the coordinates (x2,y2) of the point M2 resulting from the rotation of the above-described coordinates (x1,y1) by the amount of 2π/(N−1) are expressed by the functions similar to the formulas (16) and (17), it is proved that a regular N-polygonal figure can be determined by the rotation of a regular (N−1)-polygon.

The coordinates (x2,y2) of the point M2 resulting from the rotation of the coordinates (x1,y1) by the amount of 2π/(N−1) are expressed in accordance with the formulas (16) and (17) as follows.

$$x2 = r\{(1-N)^2\cos(\omega t + \{2\pi/(N-1)\}) - \cos(1-N)\omega t\} \quad (18)$$

$$y2 = r\{(1-N)^2\sin(\omega t + \{2\pi/(N-1)\}) - \sin(1-N)\omega t\} \quad (19)$$

In the formulas (18) and (19), r=1 and ω=1 are set.

If the coordinates of the point M2 determines a regular N-polygonal figure as the point M1 does, the form of the formulas does not change as a result of rotation by an amount of (2π/N).

The following rotational determinants (20) and (21) are used to obtain the coordinates M'(x',y') of the point M2 as a result of rotation by the amount of (2π/N).

$$= \begin{pmatrix} x_2\cos\dfrac{2\pi}{N} - y_2\sin\dfrac{2\pi}{N} \\ x_2\sin\dfrac{2\pi}{N} + y_2\cos\dfrac{2\pi}{N} \end{pmatrix} \quad (20)$$

$$= \begin{pmatrix} (1-N)^2\cos\left\{\dfrac{2\pi}{N} + t - \dfrac{2\pi}{N-1}\right\} - \cos\left\{\dfrac{2\pi}{N} + (1-N)t\right\} \\ (1-N)^2\sin\left\{\dfrac{2\pi}{N} + t - \dfrac{2\pi}{N-1}\right\} - \sin\left\{\dfrac{2\pi}{N} + (1-N)t\right\} \end{pmatrix} \quad (21)$$

The following variable t' is introduced to rearrange the formulas (20) and (21).

$$t' = t - \{2\pi/N(N-1)\} \quad (22)$$

The result is:

$$x' = (1-N)^2\cos[t' + \{2\pi/N(N-1)\} + (2\pi/N) - \quad (23)$$
$$\{2\pi/(N-1)\}] - \cos[(2\pi/N) -$$
$$(N-1)(t' + \{2\pi/N(N-1)\})]$$
$$= (1-N)^2\cos t' - \cos(1-N)t'$$

$$y' = (1-N)^2\sin[t' + \{2\pi/(N-1)\} - (2\pi/N) + \quad (24)$$
$$(2\pi/N) - \{2\pi/(N-1)\}] - \sin[(2\pi/N) -$$
$$(N-1)t' - \{(N-1)/N(N-1)\}2\pi]$$
$$= (1-N)^2\sin t' - \sin(1-N)t'$$

The above-described formulas (23) and (24) have completely the same form as the formulas (16) and (17), with t being replaced with t' only. Namely, rotation of the point M2 by the amount (2πf/N) does not cause the change in the form of formulas which represent the coordinates of the point M2. Accordingly, the point M2 determines a regular N-polygonal figure as the point M1 does.

Consequently, a regular N-polygonal figure can be determined in such a general form as the point M1 and point M2.

Rearranging these results leads out the principles (A), (B) and (C) described previously.

FIG. 41 through FIG. 46 depict the principle of operation of the case of determining a regular N-polygonal figure, whereas FIG. 47 and successive figures deal with general figures having rotational symmetry.

Figures having rotational symmetry are those as shown in FIG. 26 through FIG. 31 or those as shown in FIGS. 32 through 37.

In order for a figure to have its curving at the vertex becoming linear instead of being rounded, vectors P and Δ P must be aligned in FIG. 47. This condition is met by:

$$P \times \Delta P = 0 \tag{25}$$

The formulas (4) and (5) lead out the following formulas (26) and (27).

$$p = \begin{pmatrix} x \\ y \end{pmatrix} = \begin{pmatrix} \eta r \cos\theta - r\cos\kappa\theta \\ \eta r \sin\theta - r\sin\kappa\theta \end{pmatrix} \tag{26}$$

$$\Delta P = \begin{pmatrix} \frac{dx}{d\theta} \\ \frac{dy}{d\theta} \end{pmatrix} = \begin{pmatrix} -\eta r \sin\theta + r\kappa\sin\kappa\theta \\ \eta r \cos\theta - r\kappa\cos\kappa\theta \end{pmatrix} \tag{27}$$

Based on the formulas (26) and (27), the outer product (p×ΔP) of the vector is expressed by the following formula.

$$|P \times \Delta P| = x(dy/d\theta) - y(dx/d\theta) \tag{28}$$

$$= r^2(\eta^2 + \kappa) - \eta r^2(1+\kappa)\cos(1-\kappa)\theta$$

The term 1–N (refer to formula (9)) is substituted into of the formula (28). The formula (28) must be equal to zero, as has been mentioned in connection with the formula (25), then:

$$\cos(1-\kappa)\theta = (\eta^2+\kappa)/\{\eta(1+\kappa)\} \therefore \cos N\theta = (\eta^2+1-N)/\{\eta(2-N)\} \tag{29}$$

On the graph of cos Nθ shown in FIG. 48, there are generally solutions of 2N in number in the range of 0°≦θ<2π. However, an N-polygon which is a symmetric figure has vertexes of N in number, and therefore there are solutions of N in number in this case, which exist at the peaks of the graph.

It is obvious from FIG. 48 that if there are N solutions, then it is the case where the graph has peaks, i.e., the case of cos Nθ=±1. Substituting this condition into the formula (29) gives the following formula (30).

$$-\eta^2 \pm (2-N)\eta - 1 + N = 0 \tag{30}$$

Solving the formula (30) gives:

$$\eta = \pm(N-1) \text{ or } \eta = \pm 1 \tag{31}$$

Since η is greater than 0, then: η=N–1 or η=1.

In the case of η=N–1, e.g., N=4, such a figure as shown in FIG. 27 is determined, or in the case of η=1, such a figure as shown in FIG. 33 is determined.

Next, the relation between the area and circumferential length will be dealt with for the case of η=N–1 (for the figure as shown in FIG. 27). First, the area is calculated with reference to FIG. 49.

The area dS of a small section at an angle α is calculated, with the hatched portion being neglected, as follows.

$$dS = (1/2)P \times P \cdot d\alpha \tag{32}$$

$$= (1/2)P^2 d\alpha$$

Accordingly:

$$S = \int dS \tag{33}$$

$$= \int (1/2)P^2 d\alpha$$

The formula (33) cannot be integrated directly, and the relation of α and t must be used.

In regard to the coordinates (x,y) of the point P at the angle α in FIG. 49, there is a relation of tan α=y/x. It is rewritten by using the previous formulas (4) and (5) as follows.

$$\tan\alpha = y/x \therefore \tan\alpha = (\eta r \sin t - r \sin\kappa t)/(\eta r \cos t - r \cos\kappa t) \tag{34}$$

Differentiating both sides of the formula (34) gives:

$$\sec^2\alpha \cdot d\alpha = dt \cdot \{(\eta \cos t - \kappa\cos\kappa t)(\eta\cos t - \cos\kappa t) - \tag{35}$$

$$(\eta\sin t - \sin\kappa t)(-\eta\sin t + \kappa\sin\kappa t)\} / (\eta\cos t - \cos\kappa t)^2$$

$$= \{\eta^2 + \kappa - \eta(1+\kappa)\cos(1-\kappa)t\} \cdot dt /$$

$$(\eta\cos t - \cos\kappa t)^2$$

It is obvious from FIG. 44 as:

$$\cos\alpha = x/P \tag{36}$$

$$= r(\eta\cos t - \cos\kappa t)/P$$

The formulas (35) and (36) give:

$$d\alpha = \cos^2\alpha \cdot \{\eta^2 + \kappa - \eta(1+\kappa)\cos(1-\kappa)t\} \cdot \tag{37}$$

$$dt/(\eta\cos t - \cos\kappa t)^2$$

$$= r^2\{(\eta\cos t - \cos\kappa t)^2/P^2\} \cdot [\{\eta^2 + \kappa -$$

$$\eta(1+\kappa)\cos(1-\kappa)t\}/(\eta\cos t - \cos\kappa t)^2] \cdot dt$$

$$= (r^2/P^2)\{\eta^2 + \kappa - \eta(1+\kappa)\cos(1-\kappa)\}dt$$

Substituting the formula (37) into the formula (33) gives:

$$S = \int (1/2)P^2 \cdot (r^2/P^2)\{\eta^2 + \kappa - \eta(1+\kappa)\cos(1-\kappa)\}dt \tag{38}$$

This is not the indefinite integration, but is the finite indefinite from 0 to 2π. Accordingly, the formula (38) becomes:

$$S = (r^2/2) \cdot (\eta^2 + \kappa)2\pi \tag{39}$$

Substituting κ=1–N and η=N–1 into the formula (39) gives:

$$S = \pi r^2 (N-1)(N-2) \tag{40}$$

Next, the relation between the area and circumferential length will be dealt with for the case of $\eta=N-1$ (for the figure as shown in FIG. 27) with reference to FIG. 49.

In FIG. 49, a small section dR of the circumference is given as:

$$dR = |dP| = |P_{(t)}| \cdot dt \qquad (41)$$
$$= \{(dx/dt)^2 + (dy/dt)^2\}^{1/2} \cdot dt$$
$$= \{(-\eta \sin t + \kappa \sin \kappa t)^2 + (\eta \cos t - \kappa \cos \kappa t)^2\}^{1/2} \cdot dt$$
$$= r\{\eta^2 + (1-N)^2 - 2\eta(1-N)\cos Nt\}^{1/2} \cdot dt$$

Substituting $\eta=N-1$ into the formula (41) gives:

$$dR = 2^{1/2} \cdot (N-1)r(1+\cos Nt)^{1/2} \cdot dt \qquad (42)$$

Reforming the formula (42) by using "the formula of double angle" $\cos Nt = \cos 2 \times (N/2)t = 2\cos^2(N/2)t - 1$ results in the following formula (43).

$$dR = 2r(N-1)|\cos(N/2)t| \cdot dt \qquad (43)$$

Integrating the formula (43) results in the following formula (44).

$$R = \int 2r(N-1)|\cos(N/2)t| \cdot dt \qquad (44)$$

(The integration is not the indefinite integration, but is the finite indefinite from 0 to $2\pi$.)

The graph of $f(t)=|\cos(N/2)t|$ is as shown in FIG. 50.

The range of integration of the formula (38) is $(0-2\pi/2N) \times 2N$. Accordingly, the formula (44) becomes:

$$R = 2r(N-1) \times 2N \int \cos(N/2)t \cdot dt$$

$$R = 2r(N-1) \times 2N \int \cos(N/2)t \cdot dt \qquad (45)$$
$$\left(\begin{array}{l}\text{The integration is the finite}\\ \text{indefinite from 0 to } 2\pi/2N.\end{array}\right) = 8r(N-1)$$

Next, the circumferential lengths of the case of $\eta=N-1$ (such a figure as shown in FIG. 27) and a regular polygon having the same area is compared.

A square with a side length "a" has its area Sa given as: $Sa=a^2$.

If the area S of a figure defined by the formula (40) (a figure with $\eta=N-1$ and as shown by FIG. 27) is equal to the area Sa, then the relation $Sa\lambda=S$ holds.

Accordingly:

$$Sa=S$$
$$\therefore a^2 = \pi r^2(N-1)(N-2)$$
$$\therefore a = r\{\pi(N-1)(N-2)\}^{1/2} \qquad (46)$$

Since the circumferential length Ra of the square is equal to $4a$, the following formula holds.

$$Ra = 4r\{\pi(N-1)(N-2)\}^{1/2} \qquad (47)$$

Comparison is made based on the formulas (45) and (47) between the circumferential length R of the figure with $\eta=N-1$ and as shown by FIG. 27 and the circumferential length Ra of the square. Defining $\lambda=R/Ra$, it is expressed as:

$$\lambda = 8r(N-1)/4r\{\pi(N-1)(N-2)\}^{1/2} \qquad (48)$$
$$= 2[(N-1)/\{(N-2)\}]^{1/2}$$

Substituting N=4 into the formula (48) gives:

$$\lambda_{N=4} = 2\{(1/\pi) \cdot (3/2)\}^{1/2} = 1.36 \qquad (49)$$

The formula (49) reveals that the figure with $\eta=N-1$ and as shown by FIG. 27 has its circumferential length greater by 36% than that of the square having the same area.

Next, the circumferential lengths of the case of $\eta=N-1$ (such a figure as shown in FIG. 27) and a circle having the same area is compared.

A circle with a radius "a" has its area Sa given as: $Sa=\pi a^2$.

If the area S of a figure defined by the formula (40) (a figure with $\eta=N-1$ and as shown by FIG. 27) is equal to the area Sa, then the relation $Sa=S$ holds.

Accordingly:

$$Sa=S$$
$$\therefore \pi a^2 = \pi r^2(N-1)(N-2)$$
$$\therefore a = r\{(N-1)(N-2)\}^{1/2} \qquad (50)$$

With the circumferential length of the circle being defined as Ra, the formula (50) gives:

$$Ra = 2\pi a = 2\pi r\{(N-1)(N-2)\}^{1/2} \qquad (51)$$

Based on the formula (45), the circumferential length R of the figure with $\eta=N-1$ and as shown by FIG. 27 is given as: $R=8r(N-1)$. Defining $\lambda=R/Ra$, it is expressed as:

$$\lambda = \{8r(N-1)\}/[2\pi r\{(N-1)(N-2)\}^{1/2}] = (4/\pi)\{(N-1)/(N-2)\}^{1/2} \qquad (52)$$

The resulting function $f(N)=(4/\pi)\{(N-1)/(N-2)\}^{1/2}$ is depicted as a graph as shown in FIG. 51.

Since N is greater than or equal to 3, the function takes the largest value at N=3, and approaches gradually to the value $(4/\pi)$ as the value of N increases as shown in FIG. 51.

Substituting N=4 to the formula (52) gives:

$$\lambda_{N=4} = (4/\pi)(3/2)^{1/2} = 1.56 \qquad (53)$$

The formula (53) reveals that the figure with $\eta=N-1$ and as shown by FIG. 27 has its circumferential length greater by 56% than that of the circle having the same area.

Throughout the drawings, symbol H denotes a boring hole, O is the center of boring hole, R is a circle of trajectory, T, P and T-1 are figures used to determine regular N-polygons, G is the barycenter of boring means, r is the radius of trajectory circle, θ is the angle of revolution of the boring means, and φ and ψ are the angles of rotation of the boring means.

PREFERRED EMBODIMENTS

Next, embodiments of the present invention will be explained with reference to FIG. 1 through FIG. 40.

FIG. 1 through FIG. 16 show an embodiment of this invention which is derived from the above-described content B.

Figure 1:
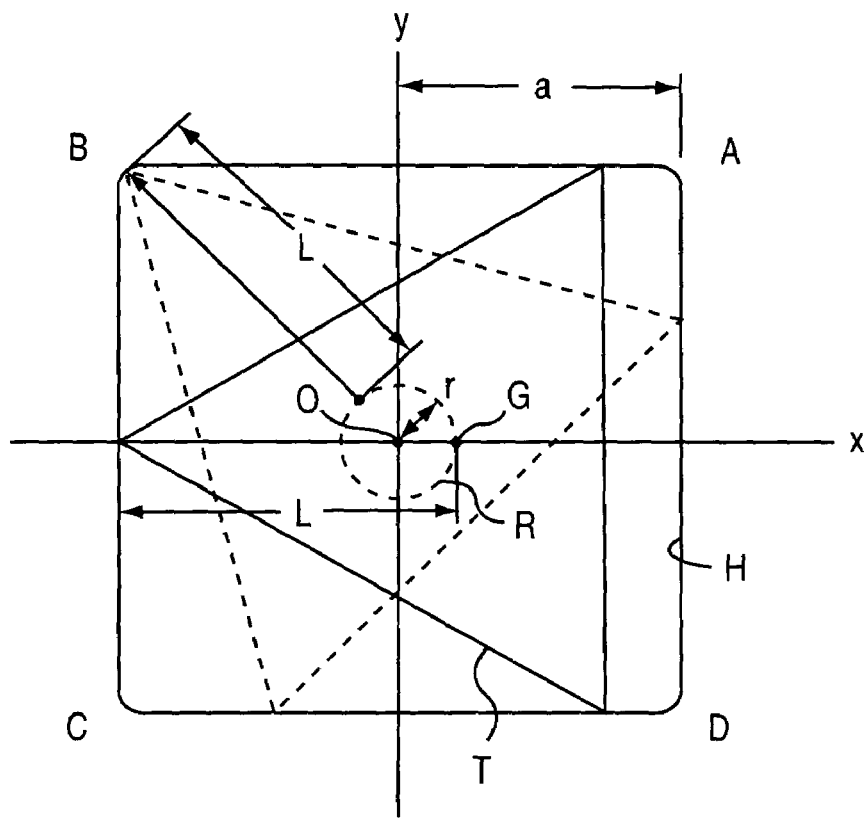
FIG. 1 is a plan view showing an embodiment of the present invention.

FIG. 1 shows the embodiment of boring which is carried out by rotating an equilateral triangular figure T which is inscribed on a square H having vertexes indicated by A, B, C and D. The manner of determination of a regular N-polygonal figure H so that it becomes a quadrilateral figure by use of the equilateral triangular figure T will be explained with reference to FIG. 2 through FIG. 7.

In the figures, the equilateral triangular figure T (a figure having a regular (N−1)-polygonal shape) is inscribed on the quadrilateral figure H with a side length 2a and has its barycenter G revolving counterclockwise along a trajectory R which has a center O and a radius r, with the revolution angle (angle of revolution) of the barycenter being indicated by θ. The figure (triangle) T rotates clockwise at a rotating speed which is ⅓ of the revolving speed, with the rotational angle (angle of rotation) being indicated by φ.

The triangle T has its distance from the barycenter G to a vertex P given by $L=2\cdot 3^{-0.5}a$, and therefore the distance r between the barycenters (O and G) of the square H and triangle T is given by $r=(2\cdot 3^{-0.5}-3)a/3$, which is the radius of the trajectory R.

Figure 2:
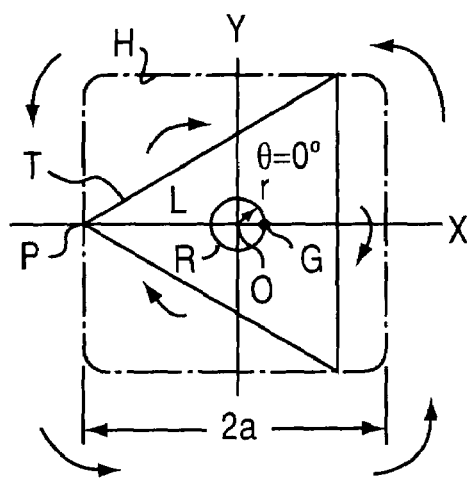
FIG. 2 is a diagram explaining a state ($\theta=0°$) of the figure determining operation shown in FIG. 1.

FIG. 2 shows the state where a line segment L which connects the vertex P of the triangle T to the barycenter G coincides with, the X axis, and the revolving angle θ is defined to be θ=0° in this state.

Figure 3:
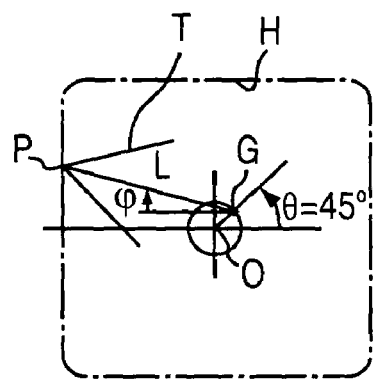
FIG. 3 is a diagram explaining a state ($\theta=45°$) of operation which is rotated from the state of FIG. 2.
Figure 4:
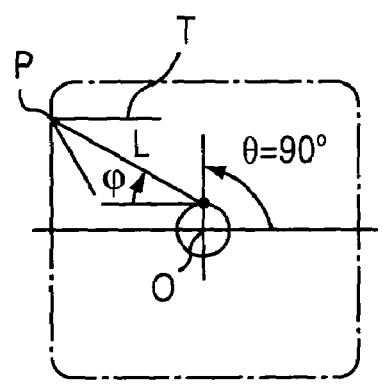
FIG. 4 is a diagram explaining a state ($\theta=90°$) of operation which is rotated from the state of FIG. 3.
Figure 5:
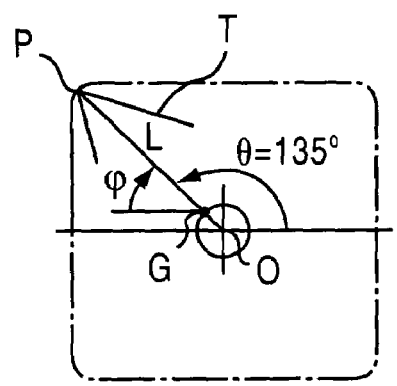
FIG. 5 is a diagram explaining a state ($\theta=135°$) of operation which is rotated from the state of FIG. 4.
Figure 6:
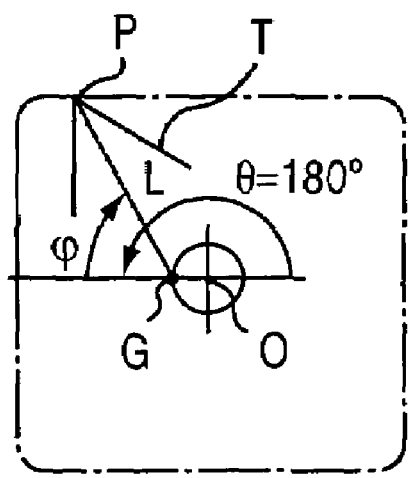
FIG. 6 is a diagram explaining a state ($\theta=180°$) of operation which is rotated from the state of FIG. 5.
Figure 7:
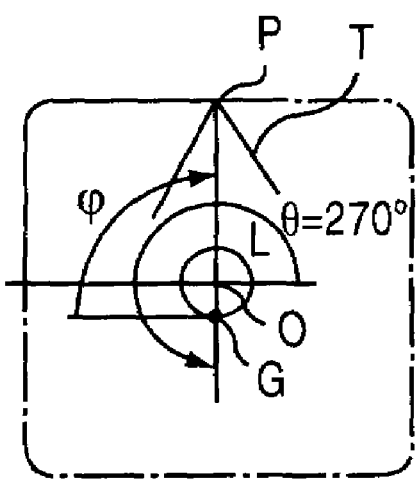
FIG. 7 is a diagram explaining a state ($\theta=270°$) of operation which is rotated from the state of FIG. 6.

Similarly, FIG. 3 and FIG. 4 show the states after the line segment L has rotated by θ=45° and θ=90°, respectively, and the triangular figure T has rotated in the opposite direction by φ=15° and φ=30°, with the locus of the vertex P forming one side of the figure H. At θ=135° of FIG. 5, the vertex P forms a round portion, and at θ=180° and θ=270° of FIG. 6 and FIG. 7, the vertex P forms a next side. Similarly, the other vertexes (not shown) of the triangle T form remaining sides, and the figure H is completed in the shape of square.

Figure 8:
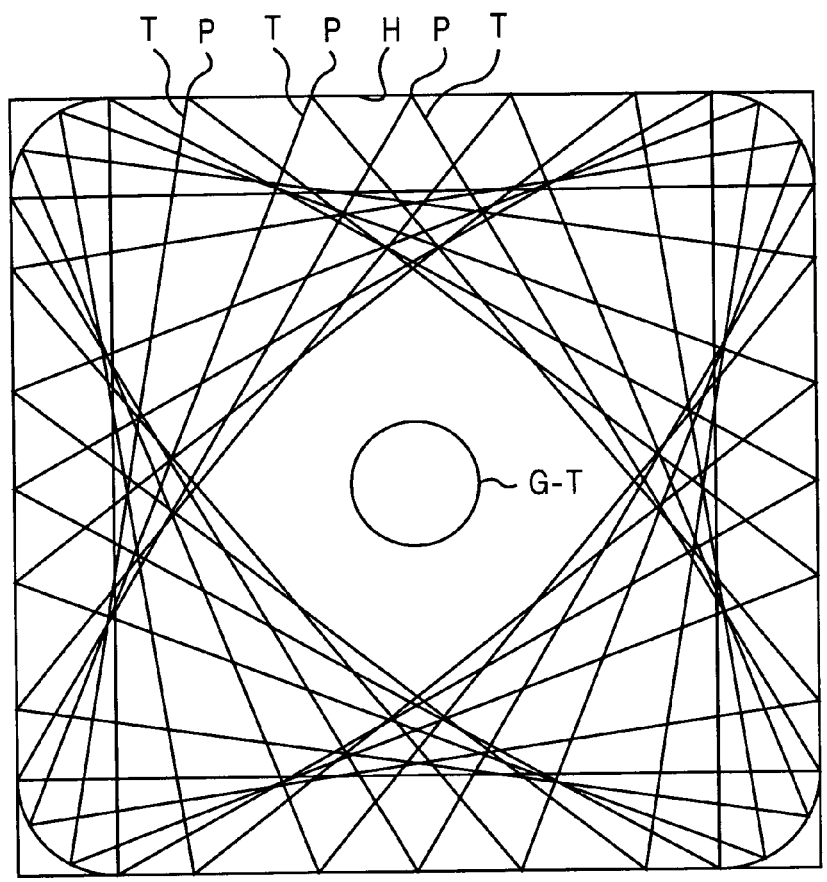
FIG. 8 is a diagram showing the locus of the figure as the envelope resulting from the states shown in FIG. 1 through FIG. 7.

FIG. 8 shows by the envelope the locus of the vertex P (of the triangular figure T) resulting from the rotation of the figure T (triangle) explained in connection with FIG. 1 through FIG. 7. It shows clearly that the locus of the vertex P creates a square cross-sectional shape of the figure H. FIG. 8 also shows by symbol G-T the locus of the barycenter G of the equilateral triangular figure T.

The cross-sectional shape of the figure H shown in FIG. 8 is the envelope determined by the eccentric rotation, and although each vertex is rounded and each side is not exactly linear, it is practically approved to be a square (regular 4-polygon).

Figure 9:
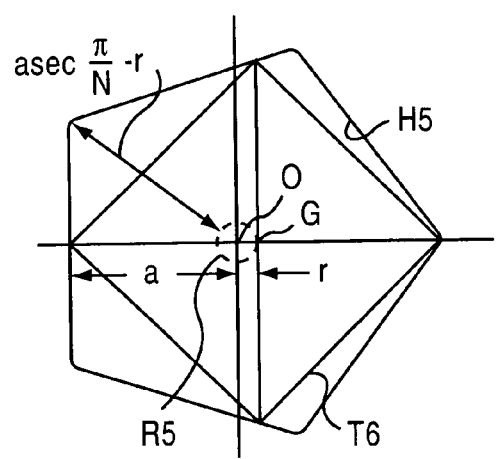
FIG. 9 is a plan view showing another embodiment of the present invention (determination of a pentagonal figure)
Figure 10:
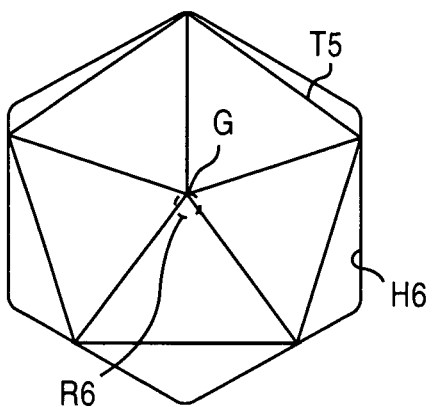
FIG. 10 is a plan view showing still another embodiment of the present invention (determination of a hexagonal figure)
Figure 11:
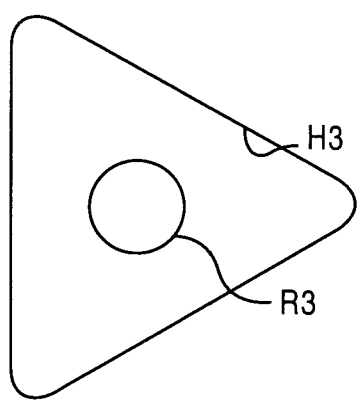
FIG. 11 is a plan view showing an example of the determination of a triangular figure based on the present invention.
Figure 12:
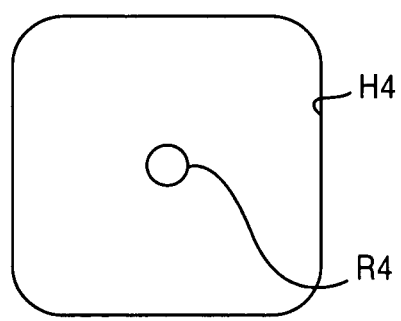
FIG. 12 is a plan view showing an example of the determination of a quadrilateral figure based on the present invention.
Figure 13:
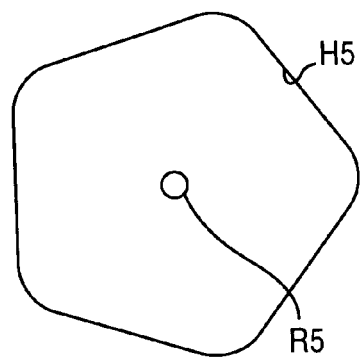
FIG. 13 is a plan view showing an example of the determination of a pentagonal figure based on the present invention.
Figure 14:
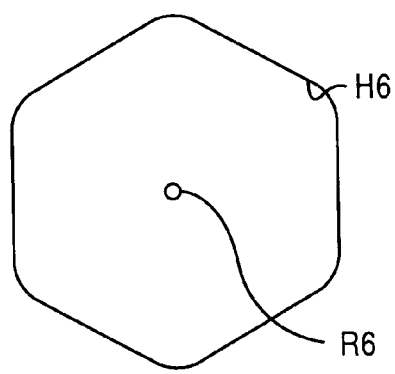
FIG. 14 is a plan view showing an example of the determination of a hexagonal figure based on the present invention.
Figure 15:
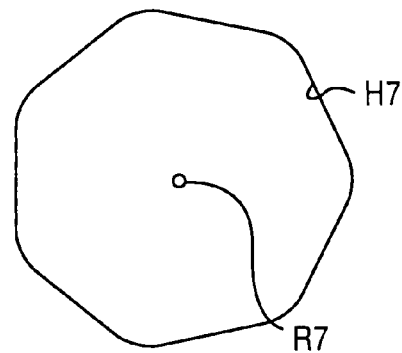
FIG. 15 is a plan view showing an example of the determination of a heptagonal figure based on the present invention.
Figure 16:
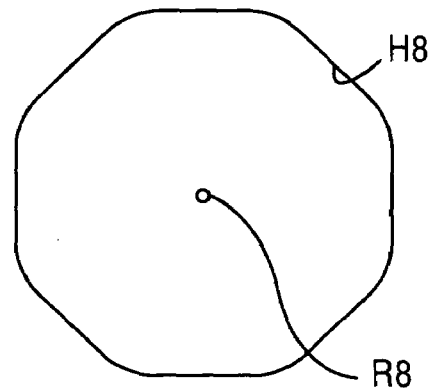
FIG. 16 is a plan view showing an example of the determination of a octagonal figure based on the present invention.

FIG. 9 shows another embodiment in which a figure T4 of a square determines a figure H5 of a equilateral pentagon, and FIG. 10 shows still another embodiment in which a figure T5 of an equilateral pentagon determines a figure H6 of an equilateral hexagon.

In these cases, the radius r of trajectory circle is the distance (OG) between the barycenters of both polygons, and is given as: $r=a\{\sec(\pi/N)-1\}/2$, where "a" is the distance from the center O to the side of the N-polygon (refer to FIG. 9).

FIG. 11 through FIG. 16 show figures H3–H8 of an equilateral triangular, quadrilateral, pentagonal, hexagonal, heptagonal and octagonal figures, respectively, created by the cutters, with their trajectories being indicated by R3–R8.

Next, an embodiment which is derived from the above-described content (A) will be explained with reference to FIG. 17 through FIG. 21.

Figure 17:
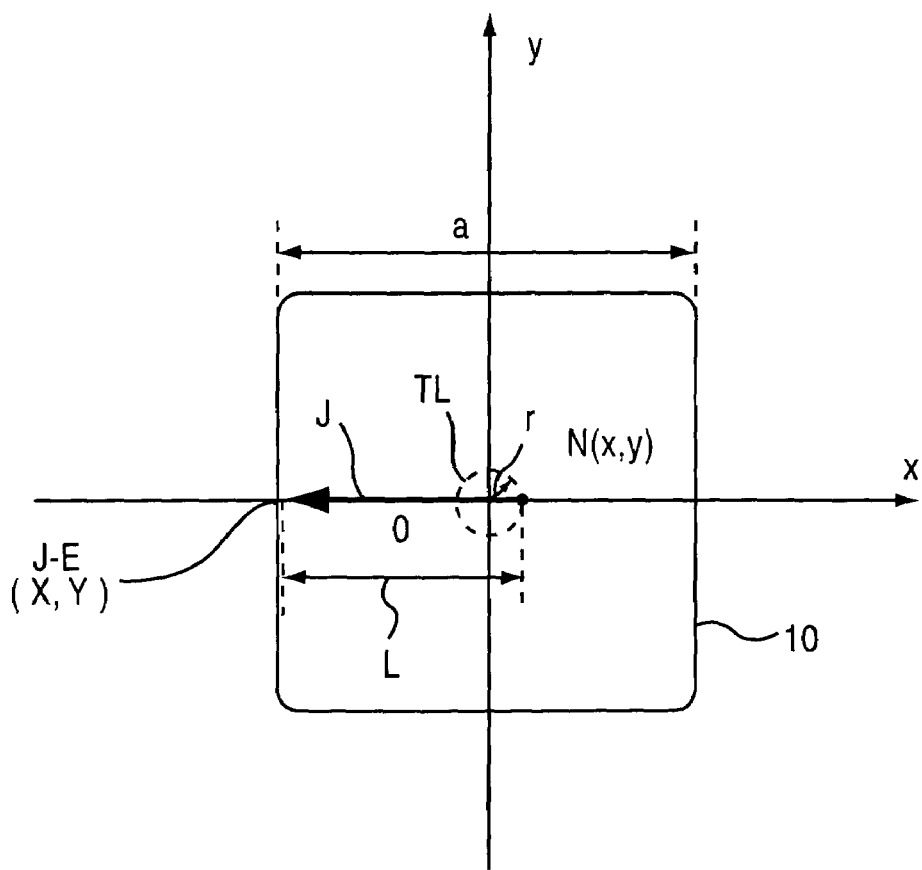
FIG. 17 is a cross-sectional diagram showing schematically a process of boring work based on another embodiment of the present invention.

In FIG. 17, a line segment which connects a first point to a second point is expressed by an arrow J, with the first and second points being indicated by N and J-E.

In FIG. 17, which shows schematically a process of determination of a square 10, a circle drawn by the locus (locus of revolution) TL of the first point N has a radius r, and then the initial position, i.e., the coordinates (x,y), of the first point N (the position shown in FIG. 17) give as (r,0), and coordinate values are generally given by the following formulas (2) and (3).

$$x=r\cos\omega t \qquad (2)$$

$$y=r\sin\omega t \qquad (3)$$

In these formulas, symbol ω denotes the angular velocity (angular velocity of revolution) of the first point which revolves around the monitor (not shown).

At the initial position shown in FIG. 17, the line segment J which connects the first point N to the second point indicated by symbol J-E exists on the X axis.

In FIG. 17, the trajectory of revolution of the first point N coincides with the locus of barycenter of an equilateral triangle having a side length "a" when it moves by being always inscribed on a square 10 (a square having a side length "a").

FIG. 18 through FIG. 21 illustrates the progress of determination of the square (regular 4-polygon) created by the locus of the line segment J or the second point J-E, with symbol θ indicating the angle of revolution of the first point N.

Figure 18:
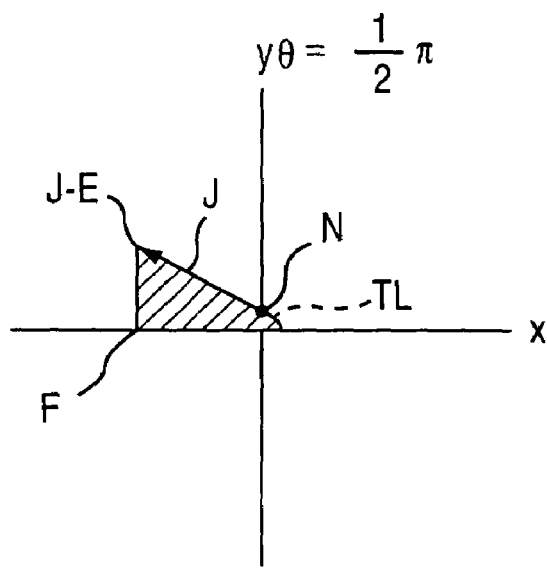
FIG. 18 is a cross-sectional diagram showing schematically a process of boring of a foundation based on the embodiment shown in FIG. 17.

FIG. 18 shows the state after the first point N has revolved counterclockwise from the position (initial position) shown in FIG. 17 by an amount of π/2 radians (or, the state after the first point N has revolved counterclockwise around the center of a regular N-polygonal figure to be determined by an amount of π/2 radians).

The second point J-E revolves around the first point N at the angular velocity ω as mentioned above, then the angular velocity of the first point N revolving around the center O of the square 10 is given by (1−N)ω. Since N=4 for the square 10, the second point J-E revolves at the angular velocity ω which is ⅓ of the revolving speed (−3 ω=(1−N)ω: N=4) of the first point N. Accordingly, the line segment J which connects the first point N to the second point J-E is not parallel to the X axis, but has an angle (an angle of revolution of the second point J-E) as shown in FIG. 18.

Due to the revolution of the first point N and second point J-E, the line segment J which connects these points moves, and the range of movement (or, passing range) determines an area which is hatched in FIG. 18.

The locus of movement of the second point J-E, i.e., the line segment which connects the point J-E to a point F, is a straight line parallel to the Y axis. Namely, the second point J-E has moved upward on the drawing in parallel to the Y axis. Symbol TL denotes the locus of movement of the first point N. For the purpose of simplicity, hatching is not provided for the range of movement or passing range in the remaining FIG. 19 through FIG. 21.

Figure 19:
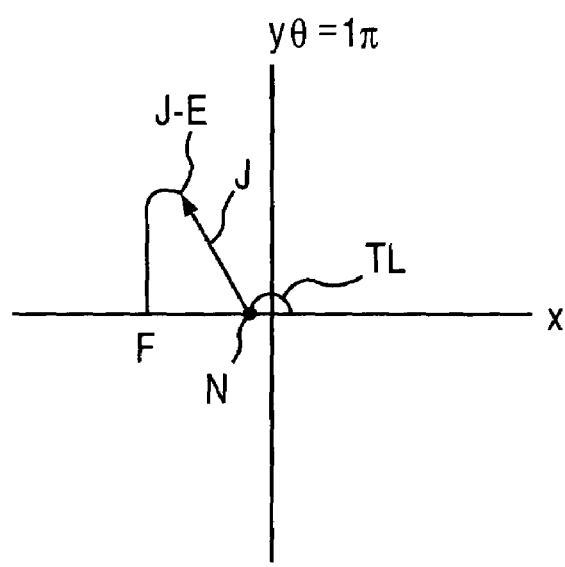
FIG. 19 is a cross-sectional diagram showing schematically a process of boring of the foundation.
Figure 20:
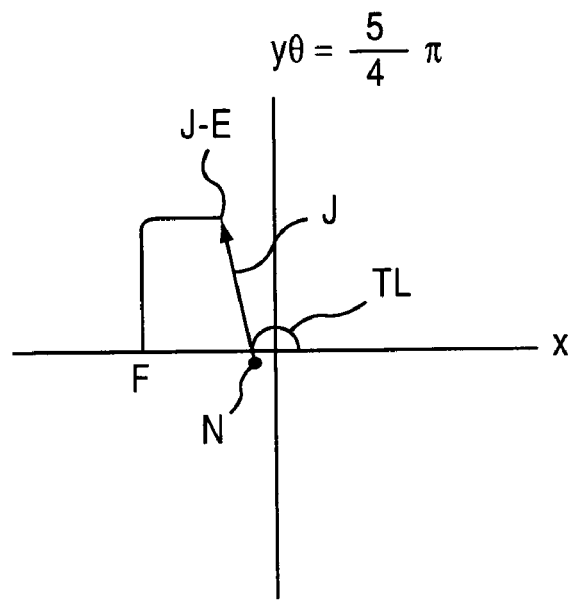
FIG. 20 is a cross-sectional diagram showing schematically a process of boring of the foundation.
Figure 21:
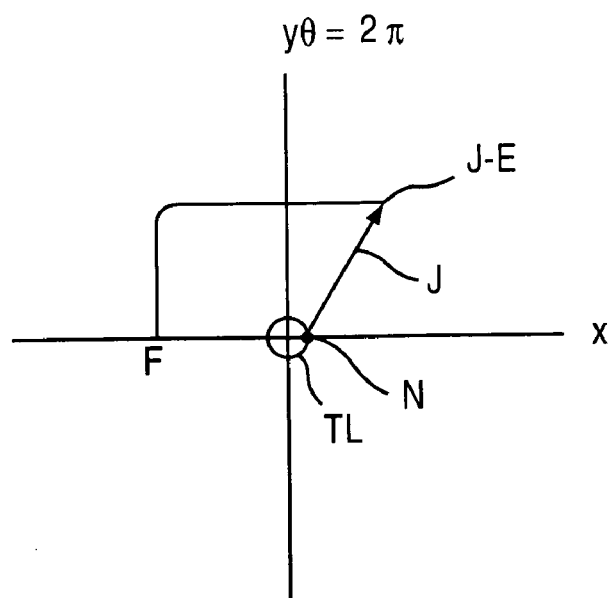
FIG. 21 is a cross-sectional diagram showing schematically a process of boring of the foundation.

FIG. 19 shows the state after the first point N has revolved counterclockwise by an amount of π radians from the initial position. During the time, the locus of the second point J-E has moved in parallel to the Y axis and then moved to the right in parallel to the X axis. In the state shown in FIG. 20, when the first point N has revolved by an amount of 5π/4 from the initial position, the second point J-E has further moved to the right in parallel to the X axis. After the first point N has revolved by an amount of 2 radians (i.e., after it has made one revolution along the locus TL), the second point J-E reaches the position shown in FIG. 21.

After the first point N has revolved by an amount of 6π from the initial position, i.e., it has made three revolutions along the locus TL, although this case is not shown, the second point J-E returns to its initial position F (i.e., it makes one revolution around the first point N), completing the determination of a square, i.e., regular 4-polygonal figure.

Although the determined square 10 has its vertexes rounded to some extent, the difference of the rounded vertex from the vertex of right angles is negligibly small in a sense of practice of engineering.

Next, an embodiment which is derived from the above-described content (C) will be explained with reference to FIG. 22 through FIG. 25.

In this embodiment shown in FIG. 22 through FIG. 25, a boring hole has a cross-sectional shape of square, i.e., a regular N-polygonal figure with N=4.

In FIG. 22 through FIG. 25, the equilateral pentagonal (regular (N−1)-polygonal) figure P has its barycenter (the center of the figure) G moving (revolving) clockwise along a circular locus R having a radius r from the center O of the boring hole H, with the revolving angle (angle of revolution) being indicated by symbol θ.

The radius r of the locus drawn by the barycenter of the figure P is 1/25 (i.e., $1/(N-1)^2$) of the radius of a circle (not shown in FIG. 22 through FIG. 25) which is circumscribed on the figure P. In other words, the equilateral pentagonal figure P has a contour which is inscribed on a circle (not shown in FIG. 22 through FIG. 25) having a radius 25r (i.e., $(N+1)^2 r$).

The revolving figure P also rotates at a velocity which is 1/5, (i.e., 1/(N+1)) of the revolving speed, with the rotating angle (angle of rotation) being indicated by ψ.

In dealing with the passing range or moving range of the pentagonal figure P in FIG. 22 through FIG. 25, only the locus of a vertex PE-1 of the figure P will be taken into account in the following.

In FIG. 22 through FIG. 25, indicated by symbol IS is a cross-sectional shape of the case with the assumption that a boring hole with a complete quadrilateral shape can be bored, or in other words it shows an ideal cross-sectional shape.

Figure 22:
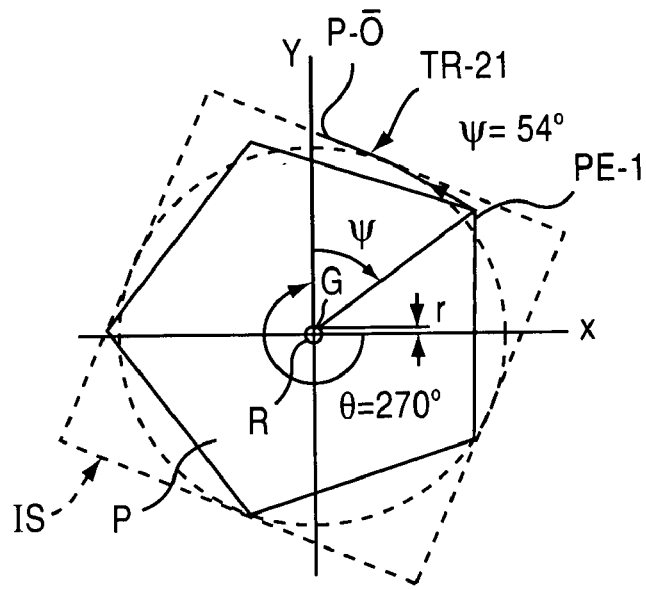
FIG. 22 is a cross-sectional diagram showing schematically a process of boring of a foundation based on another embodiment of the present invention.

FIG. 22 shows the state after the figure P has revolved by 270° and rotated by 54° from the initial state. As a result, the figure P has its one vertex PE-1 drawing a locus indicated by symbol TR-21 from the origin P-O.

Figure 23:
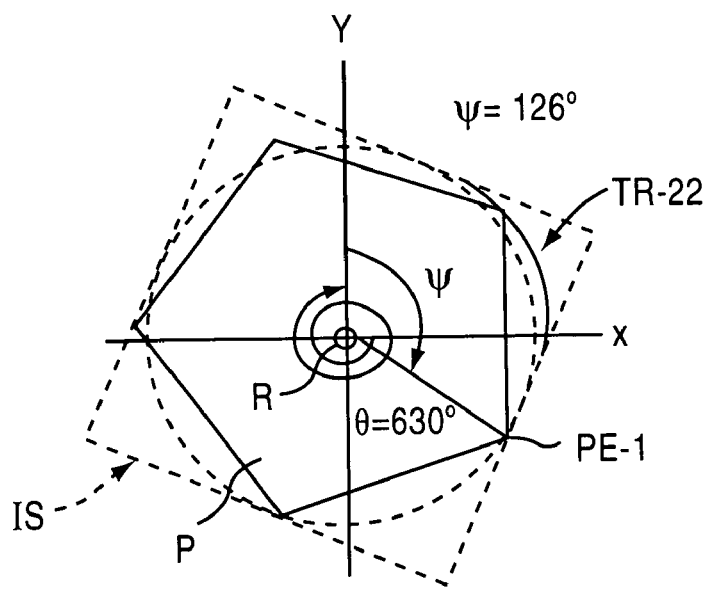
FIG. 23 is a cross-sectional diagram showing schematically a process of boring of the foundation.

FIG. 23 shows the state after the figure P has revolved by 630° and rotated by 126°. As a result, the figure P has its vertex PE-1 drawing a locus indicated by symbol TR-22.

Figure 24:
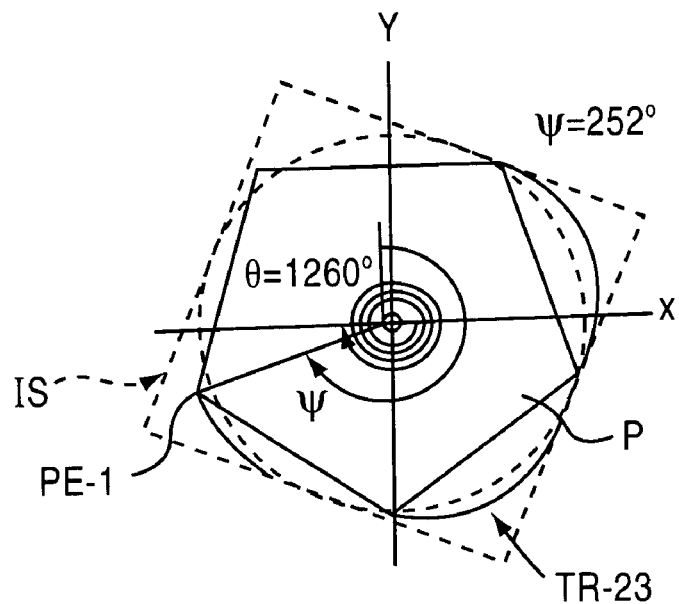
FIG. 24 is a cross-sectional diagram showing schematically a process of boring of the foundation.

FIG. 24 shows the state after the figure P has revolved by 1260° and rotated by 252°. As a result, the figure P has its vertex PE-1 drawing a locus indicated by symbol TR-23.

Figure 25:
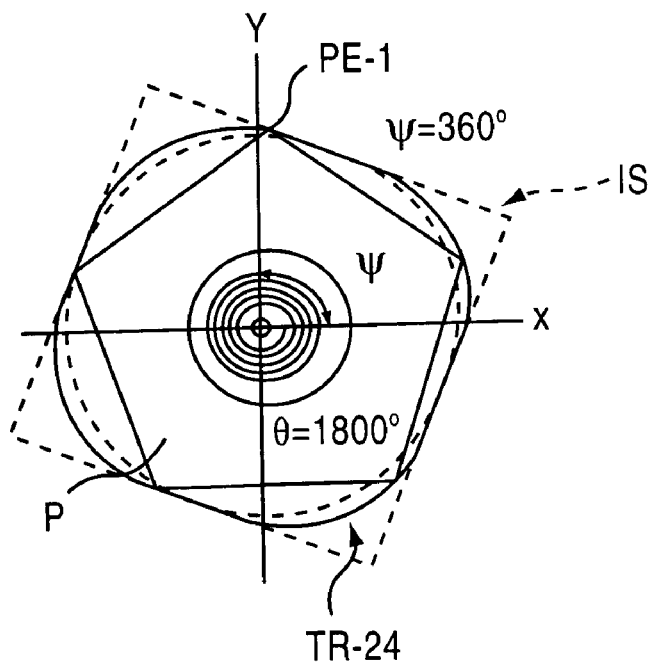
FIG. 25 is a cross-sectional diagram showing schematically a process of boring of the foundation.

FIG. 25 shows the state after the figure P has revolved by 1800° and rotated by 360°. As a result of one rotation, the figure P has its vertex PE-1 drawing a closed loop indicated by symbol TR-24. Comparing the locus TR-24 with the ideal cross-sectional shape IS reveals that the locus TR-24 (i.e., the cross-sectional shape of the region cut by the figure P) has four arcuate corners. This locus, however, makes an approximately quadrilateral figure, and it is practically approved to be a bored boring hole with a square cross-sectional shape.

In the embodiments explained in connection with FIG. 1 through FIG. 25, the determined figures are regular N-polygonal figures having their vertexes connected by straight lines.

As described previously, by making smaller than $(N-1)^2$ the ratio of the distance between the first point and the center to the distance between the second point and the first point or the ratio of the radial distance between the rotation center of the figure and the center of the figure to be determined to the distance between the rotation center and the tip of the figure, it is possible to make the cross-sectional shape of the sweep range of the figures T and P identical to the shape formed by arcuate curves which connect neighboring vertexes.

Figure 26:
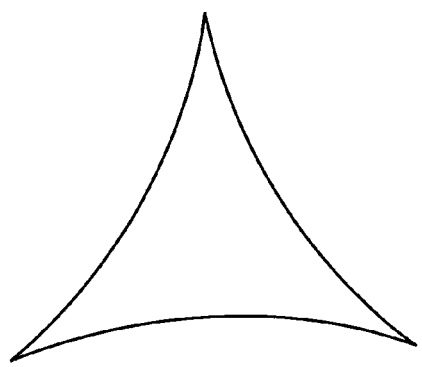
FIG. 26 is a plan view showing an example of the determination of a triangular figure based on another embodiment of the present invention.
Figure 27:
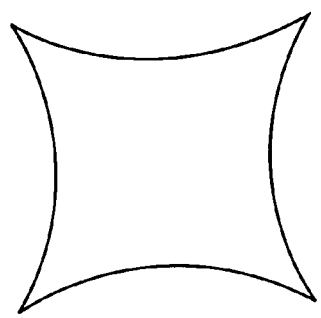
FIG. 27 is a plan view showing an example of the determination of a quadrilateral figure based on another embodiment of the present invention.
Figure 28:
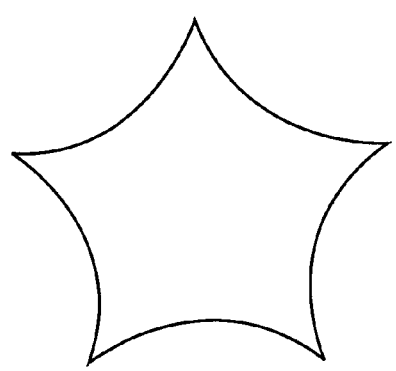
FIG. 28 is a plan view showing an example of the determination of a pentagonal figure based on another embodiment of the present invention.
Figure 29:
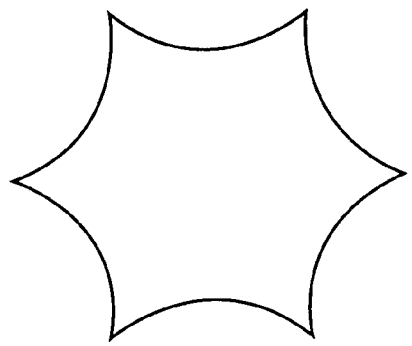
FIG. 29 is a plan view showing an example of the determination of a a hexagonal figure based on another embodiment of the present invention.
Figure 30:
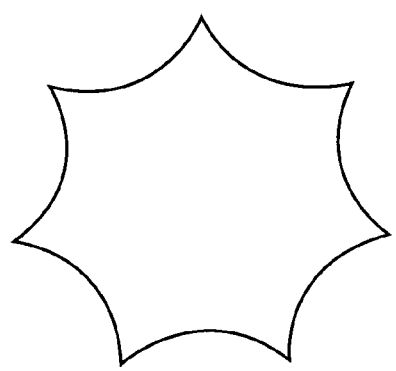
FIG. 30 is a plan view showing an example of the determination of a heptagonal figure based on another embodiment of the present invention.
Figure 31:
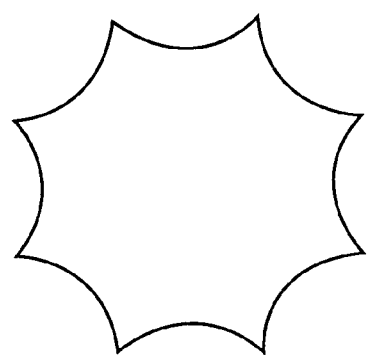
FIG. 31 is a plan view showing an example of the determination of an octagonal figure based on another embodiment of the present invention.

FIG. 26 through FIG. 31 show shapes of figures which are determined by the embodiments shown in FIG. 17 through FIG. 21, with the ratio being set to (N−1). FIG. 26 is for N=3, FIG. 27 is for N=4, FIG. 28 is for N=5, FIG. 29 is for N=6, FIG. 30 is for N=7, and FIG. 31 is for N=8.

Figure 55:
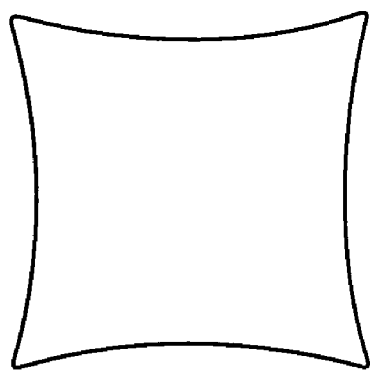
FIG. 55 is a plan view showing the shape of a through hole or pit bored by still another embodiment of the present invention.

FIG. 55 shows the case where N=4 and the ratio ("the ratio of the distance between the first point and the center to the distance between the second point and the first point" or "the ratio of the radial distance between the rotation center of the figure and the center of the figure to be determined to the distance between the rotation center and the tip of the figure") is set to N.

As mentioned above, by making the distance between the first point and the center to be r and making the distance between the first point and the center to the length of the line segment which connects the first point to the second point smaller than $(N-1)^2$, it is possible to determine a figure which is formed by closed regions of N in number and is symmetric with respect to the center of the boring hole.

Figure 32:
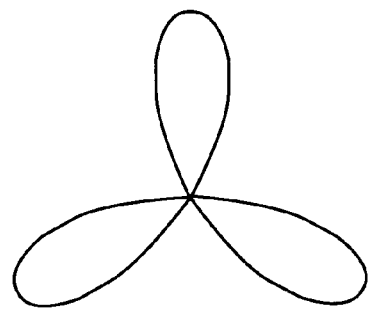
FIG. 32 is a plan view showing an example of the determination of a triangular figure based on still another embodiment of the present invention.
Figure 33:
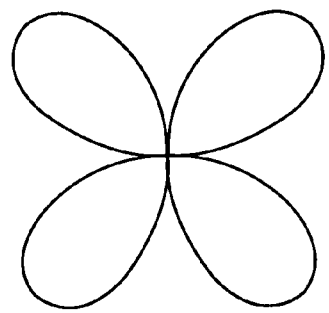
FIG. 33 is a plan view showing an example of the determination of a quadrilateral figure based on still another embodiment of the present invention.
Figure 34:
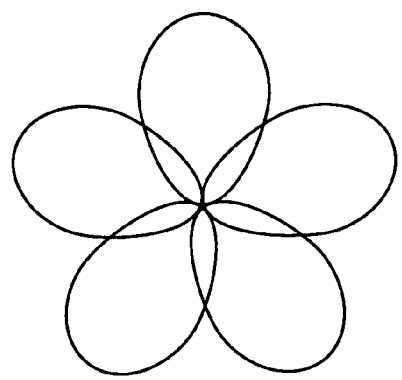
FIG. 34 is a plan view showing an example of the determination of a pentagonal figure based on still another embodiment of the present invention.
Figure 35:
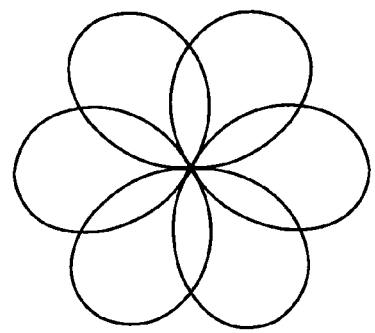
FIG. 35 is a plan view showing an example of the determination of a hexagonal figure based on still another embodiment of the present invention.
Figure 36:
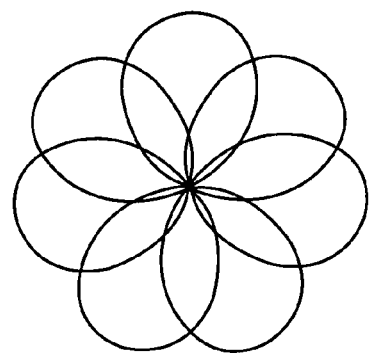
FIG. 36 is a plan view showing an example of the determination of a heptagonal figure based on still another embodiment of the present invention.
Figure 37:
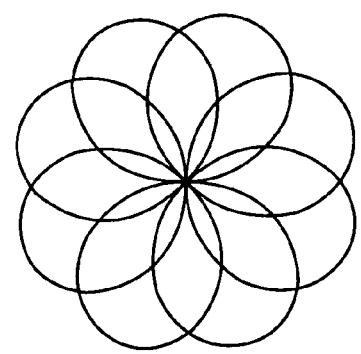
FIG. 37 is a plan view showing an example of the determination of an octagonal figure based on still another embodiment of the present invention.

FIG. 32 through FIG. 37 show shapes of figures which are determined by the embodiments shown in FIG. 17 through FIG. 21, with the ratio being set to 1. FIG. 32 is for N=3, FIG. 33 is for N=4, FIG. 34 is for N=5, FIG. 35 is for N=6, FIG. 36 is for N=7, and FIG. 37 is for N=8.

Figure 54:
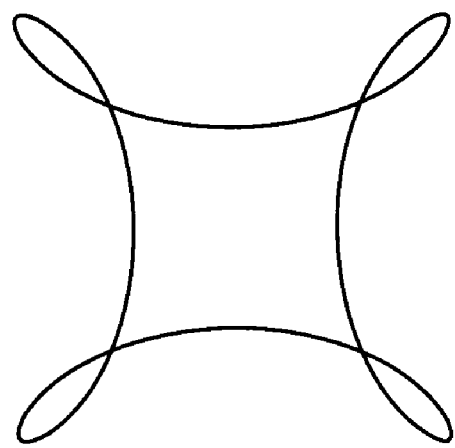
FIG. 54 is a plan view showing the shape of a through hole or pit bored by another embodiment of the present invention.

FIG. 54 shows the case where N=4 and the ratio (the ratio of the distance between the first point and the center to the distance between the second point and the first point or the ratio of the radial distance between the rotation center of the figure and the center of the figure to be determined to the distance between the rotation center and the tip of the figure) is set to N−2.

The remaining affairs of the embodiments of FIG. 26 through FIG. 31, embodiments of FIG. 32 through FIG. 37, the embodiment of FIG. 54 and the embodiment of FIG. 55 are virtually identical to the embodiment of FIG. 17 through FIG. 21.

Next, an embodiment of the determination of a figure having a regular N-polygonal (e.g., square, i.e., regular 4-polygonal) figure will be explained with reference to FIG. 38 through FIG. 40.

Figure 38:
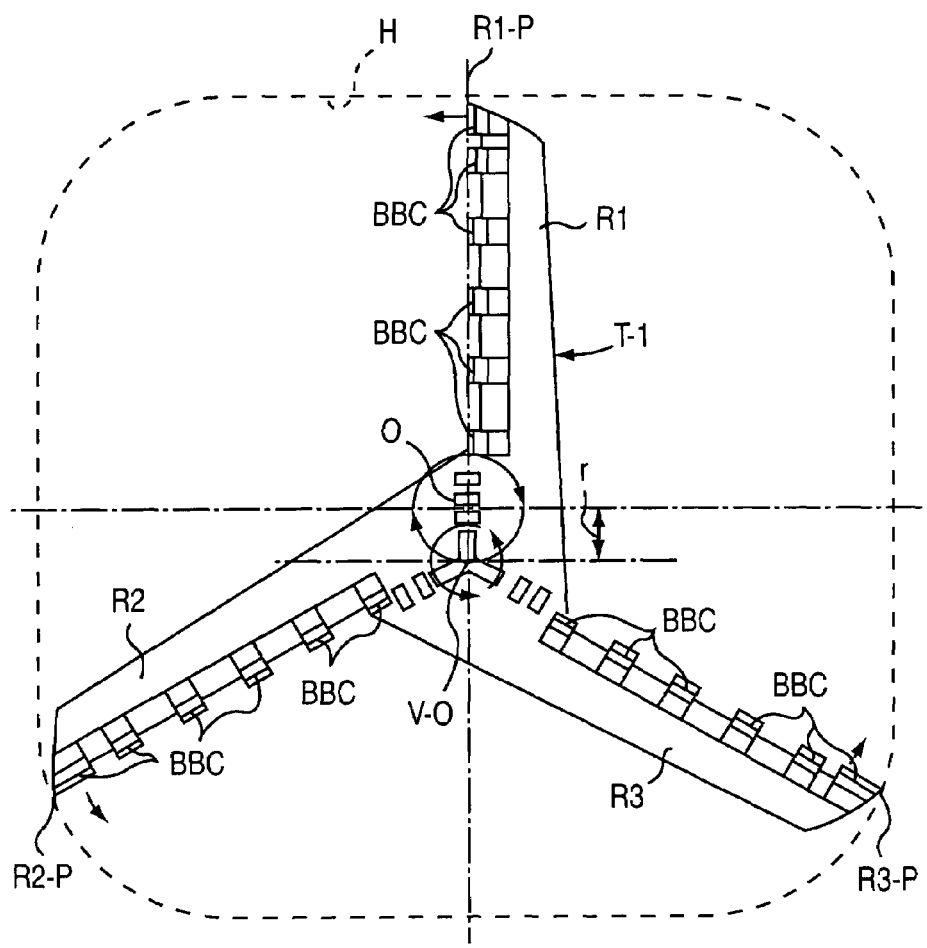
FIG. 38 is a plan view showing an example of figures used in still another embodiment of the present invention.
Figure 39:
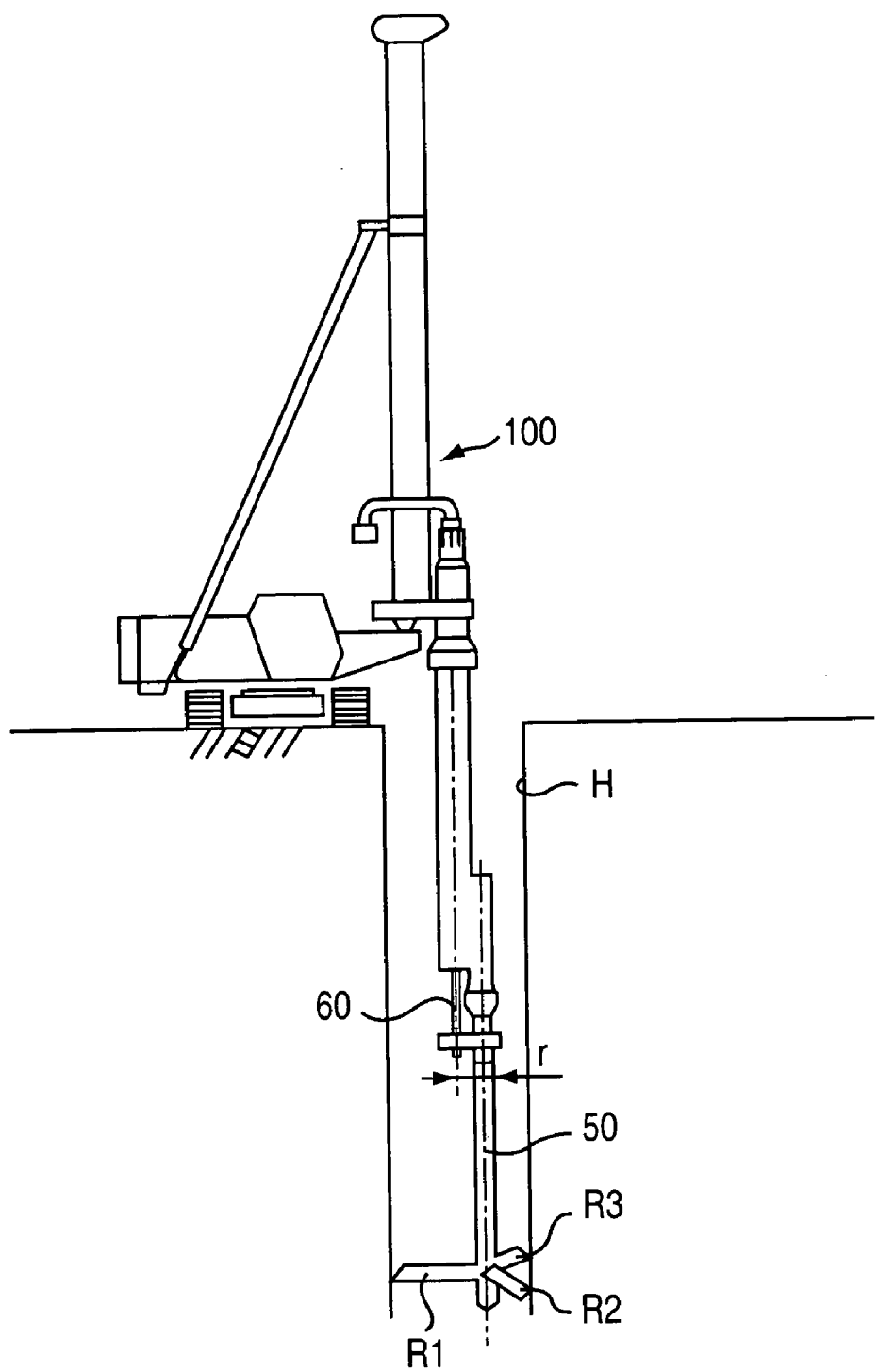
FIG. 39 is a front view showing the application of the embodiment shown in FIG. 38 to a boring hole.

FIG. 38 and FIG. 39 explain the embodiment of the determination of a square (equilateral quadrilateral) figure in the same manner as for the figure (the equilateral triangular figure shown by T in FIG. 1 through FIG. 8) used in the embodiment of FIG. 1 through FIG. 8. Specifically, a figure T-1 (as shown particularly in FIG. 38) having three line segments R1, R2 and R3 extending in radius direction from the center (start point), i.e., a figure which is defined by setting a start point of revolution along a circle which is concentric to the center of a regular N-polygonal figure to be determined and has a radius r and placing line segments of N in number at a constant interval from the start point along the circle, with the point on the side opposite to the line segment start point being located on a circle having a radius $(N-1)^2 r$, is manipulated to rotate and revolve as explained in connection with FIG. 1 through FIG. 8.

Specifically, FIG. 38 and FIG. 39 explain the application of the present invention to the boring of a boring hole. Therefore, the figure T-1 represents a drill bit, with the line segments R1, R2 and R3 representing blades each having chips.

In FIG. 38, the figure indicated in its entirety by symbol T-1 has three line segments R1, R2 and R3 (line segments of N in number placed at a constant interval from the start point along the circle) which are arranged symmetrically with respect to the rotation center V-O (start point).

The rotation center V-O of the figure T-1 is located on the barycenter of an equilateral triangle which is drawn by connecting the end point R1-P of the line segment R1, the end point R2-P of the line segment R2 and the end point R3-P of the line segment R3.

The rotation center V-O (start point) is eccentric by a distance r from the center O of the figure H which is determined by the figure T-1.

In applying the embodiment of FIG. 38 to the boring of a boring hole, the center of the figure to be determined must be coincident with the center O of the boring hole H, and in FIG. 39, it must be coincident with the center axis of the boring rod 60 of the boring machine indicated by 100. Furthermore, in applying the embodiment to the boring of a boring hole, the figure T-1 must be placed such that its rotation center (start point) V-O revolves, while rotating, along a circle which is distant by r from the center axis O of the boring rod 60 of the boring machine.

In the embodiment of FIG. 38 and FIG. 39, when the figure T-1 rotates at an angular velocity $\omega$, it revolves around the boring rod 60 (or the center O of the boring hole H) at an angular velocity $(1-N)\omega$.

With the rotation center V-O of the figure T-1 being distant in radius direction by r from the center O of the boring hole H (or the center axis of the boring rod 60) as mentioned previously, the distance from the rotation center V-O of the figure T-1 to the end points R1-P, R2-P and R3-P of the line segments R1, R2 and R3 is set to be $(N-1)^2 r$.

Consequently, the sweep range of the figure T-1, i.e., the cross-sectional shape of the boring hole H cut by the figure T-1, becomes an equilateral quadrilateral figure which is circumscribed on a circle having a radius $N(N-2)r$.

The remaining affairs on the arrangement and function of the embodiment shown in FIG. 38 and FIG. 39 are identical to the embodiment of FIG. 1 through FIG. 8.

Figure 40:
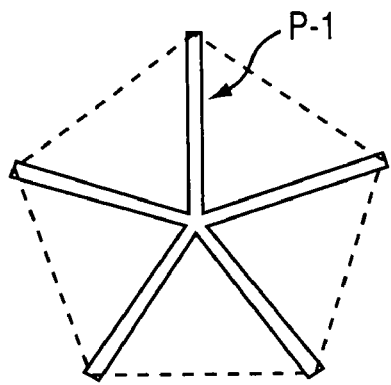
FIG. 40 is a diagram showing another example figures.
Figure 41:
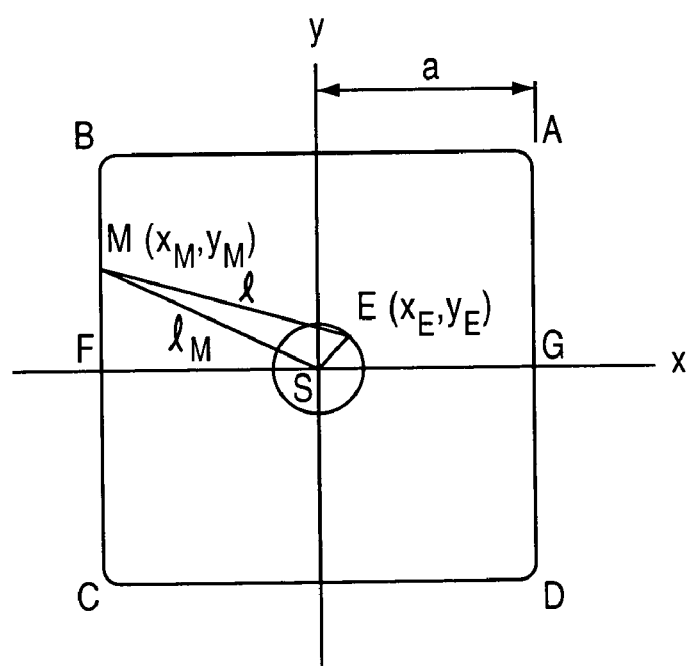
FIG. 41 is a diagram used to explain the principle of operation of the present invention.
Figure 42:
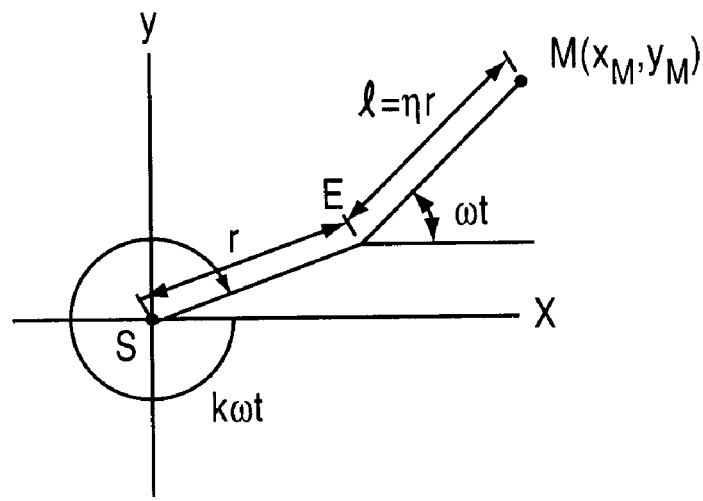
FIG. 42 is a diagram used to explain the principle of operation of the present invention similarly to FIG. 41.
Figure 43:
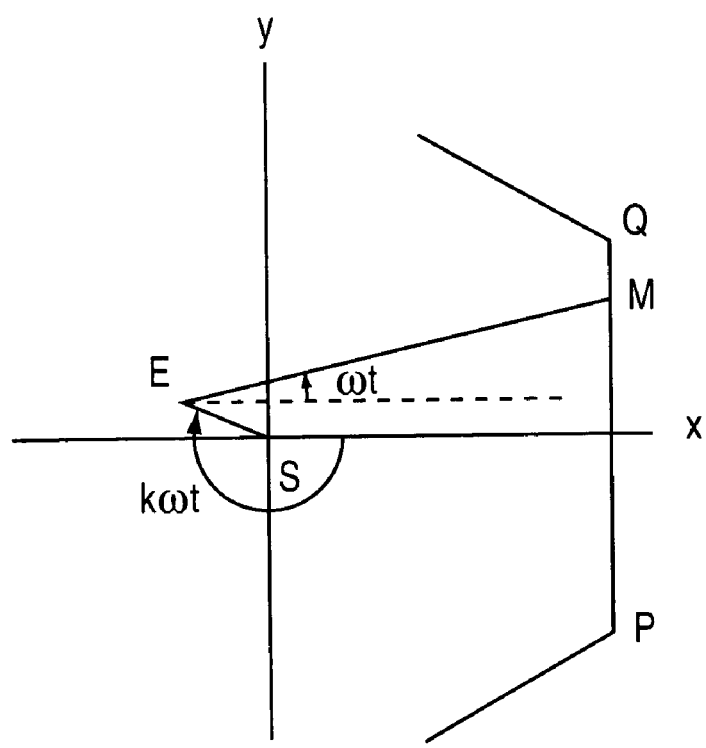
FIG. 43 is a diagram used to explain the principle of operation of the present invention similarly to FIG. 41 and FIG. 42.
Figure 44:
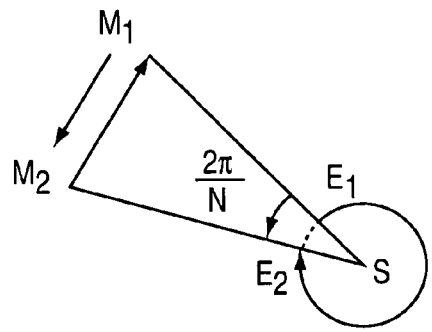
FIG. 44 is a diagram used to explain the principle of operation of the present invention similarly to FIG. 41 through FIG. 43.
Figure 45:
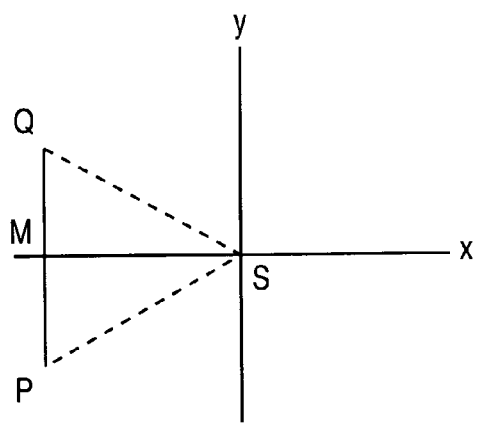
FIG. 45 is a diagram used to explain the principle of operation of the present invention similarly to FIG. 41 through FIG. 44.
Figure 46:
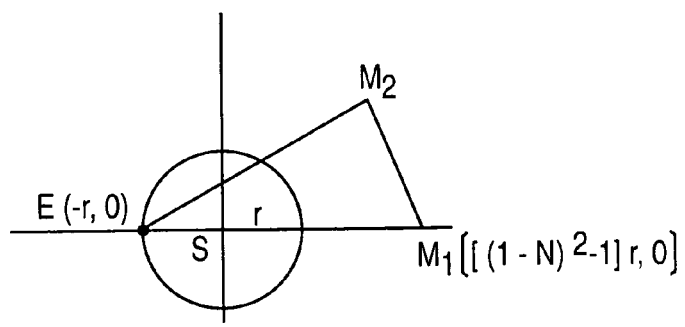
FIG. 46 is a diagram used to explain the principle of operation of the present invention similarly to FIG. 41 through FIG. 45.
Figure 47:
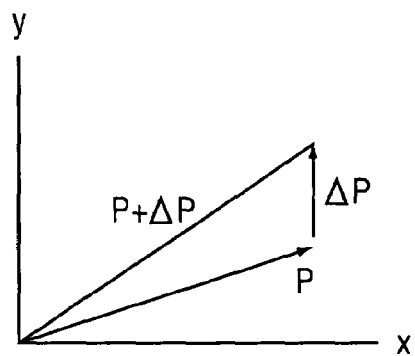
FIG. 47 is a diagram used to explain the principle of operation of the present invention similarly to FIG. 41 through FIG. 46.
Figure 48:
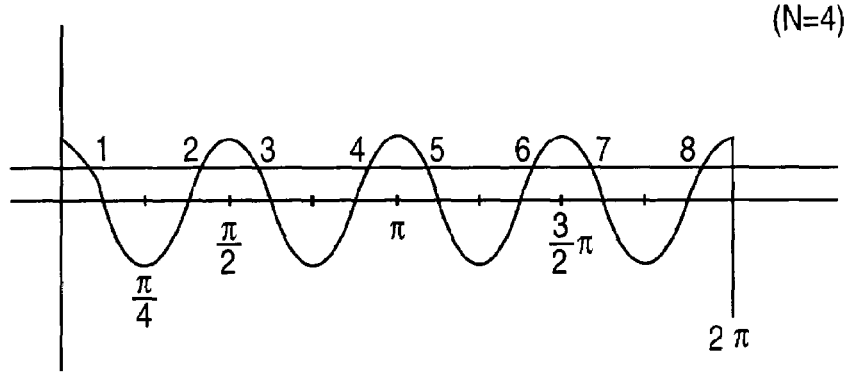
FIG. 48 is a graph used to explain the principle of operation of the present invention similarly to FIG. 41 through FIG. 47.
Figure 49:
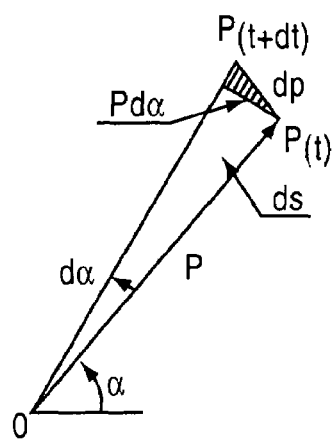
FIG. 49 is a diagram used to explain the principle of operation of the present invention similarly to FIG. 41 through FIG. 48.
Figure 50:
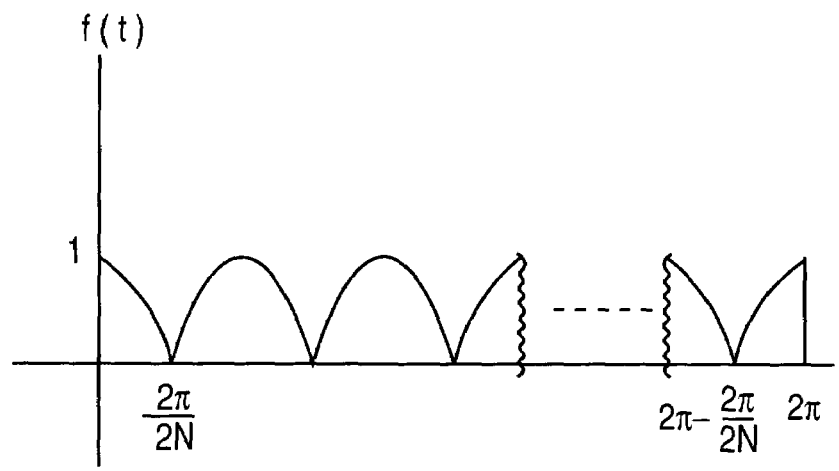
FIG. 50 is a graph used to explain the principle of operation of the present invention similarly to FIG. 41 through FIG. 49.
Figure 51:
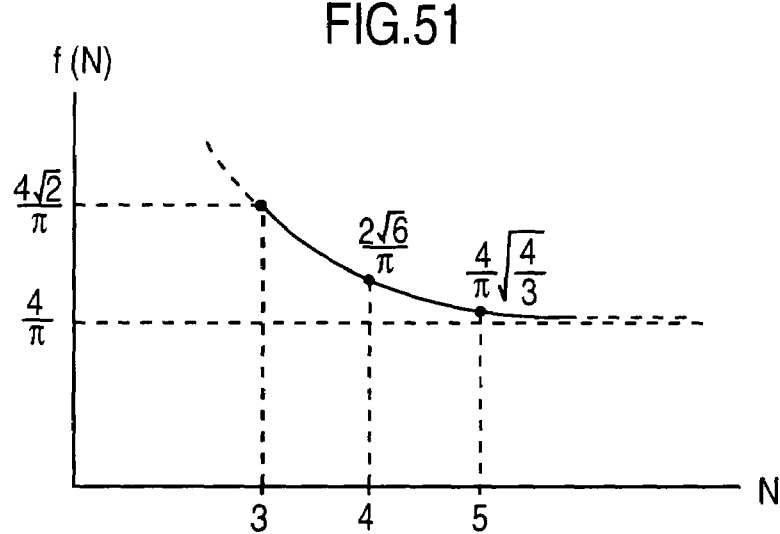
FIG. 51 is a diagram used to explain the principle of operation of the present invention similarly to FIG. 41 through FIG. 50.

Similar to the embodiment of FIG. 38 and FIG. 39, when a figure P-1 having a cross-sectional shape made up of five rods joined at the center as shown in FIG. 40 is manipulated to rotate and revolve in the same manner as explained in connection with FIG. 22 through FIG. 25, a square (equilateral quadrilateral) figure can be determined by the figure shown by the dashed line in FIG. 40 (the cutter of a equilateral pentagonal figure indicated by symbol P in FIGS. 22–25).

Figure 52:
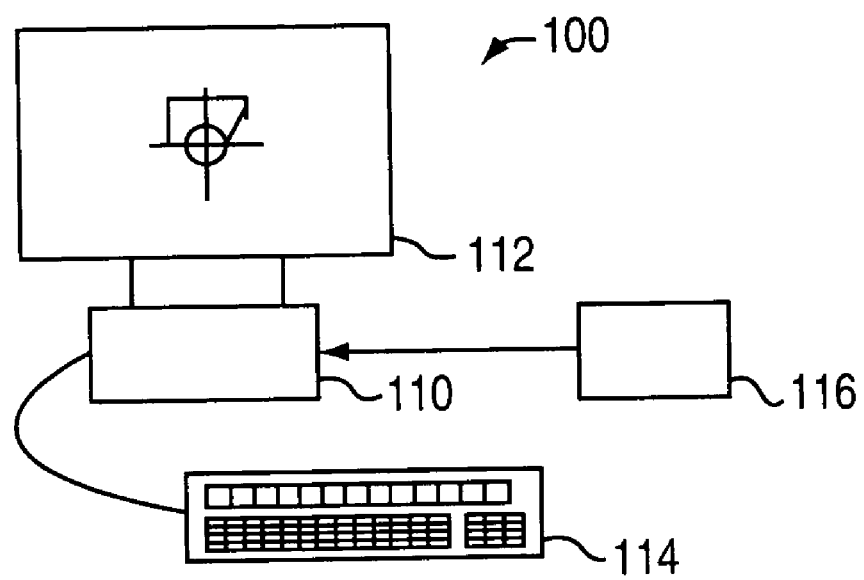
FIG. 52 is a block diagram of an embodiment of the present invention.

FIG. 52 shows by block diagram an example of the system which carries out the embodiments shown in FIG. 1 through FIG. 40.

The system indicated in its entirety by 100 includes a computer 110. The system further includes a display unit 112 which displays the result of process produced by the computer 110, a keyboard 114 which is used to enter data and other information, and a database 116 which stores various data.

Next, the operation of the system 100 of FIG. 52 for determining a figure will be explained with reference to FIG. 53.

According to the present invention, it is possible to determine various figures such as figures having vertexes connected by straight lines as explained in connection with FIG. 1 through FIG. 25, figures having vertexes connected by arcuate curves as shown in FIG. 26 through FIG. 31, and figures which are made up of closed regions of N in number formed by curves and symmetric with respect to the boring hole center (refer to FIG. 32 through FIG. 37).

Accordingly, in operating the system 100 of FIG. 52, it is necessary to choose a type of figure to be determined: (step S1).

Following the selection of a type of figure to be determined in step S1, one of the determination schemes (scheme (A), (B) or (C), or the scheme explained on FIG. 38) is specified: (step S2). Specifically, a scheme which is most suitable for the operator is selected in consideration of the object of figure determination, situation, place, and other individual (case-by-case) conditions.

Next to the setting of a type of figure to be determined and a determination scheme, parameters of figure determination (e.g., number of vertexes N, distance r, angular velocity $\omega$, etc.) are entered through the keyboard 114: (step S3). Then, the computer 110 implements the process (explained in connection with FIG. 1 through FIG. 51) (the progression of the flowchart with steps S4 and S5 having determinations of "no").

Following the determination of a figure: (step S5: "yes"), the determined figure is examined: (step S6). If it is found defective (step S6: "no"), the processing steps S1–S5 are repeated.

If the determined figure is found good: (step S6: "yes"), the sequence proceeds to step S7 to carry out an intended process for the figure (e.g., conversion of the figure into data, transfer of the figure to the controller of a machine as shown in FIG. 39, etc.): (step S7).

Figure 53:
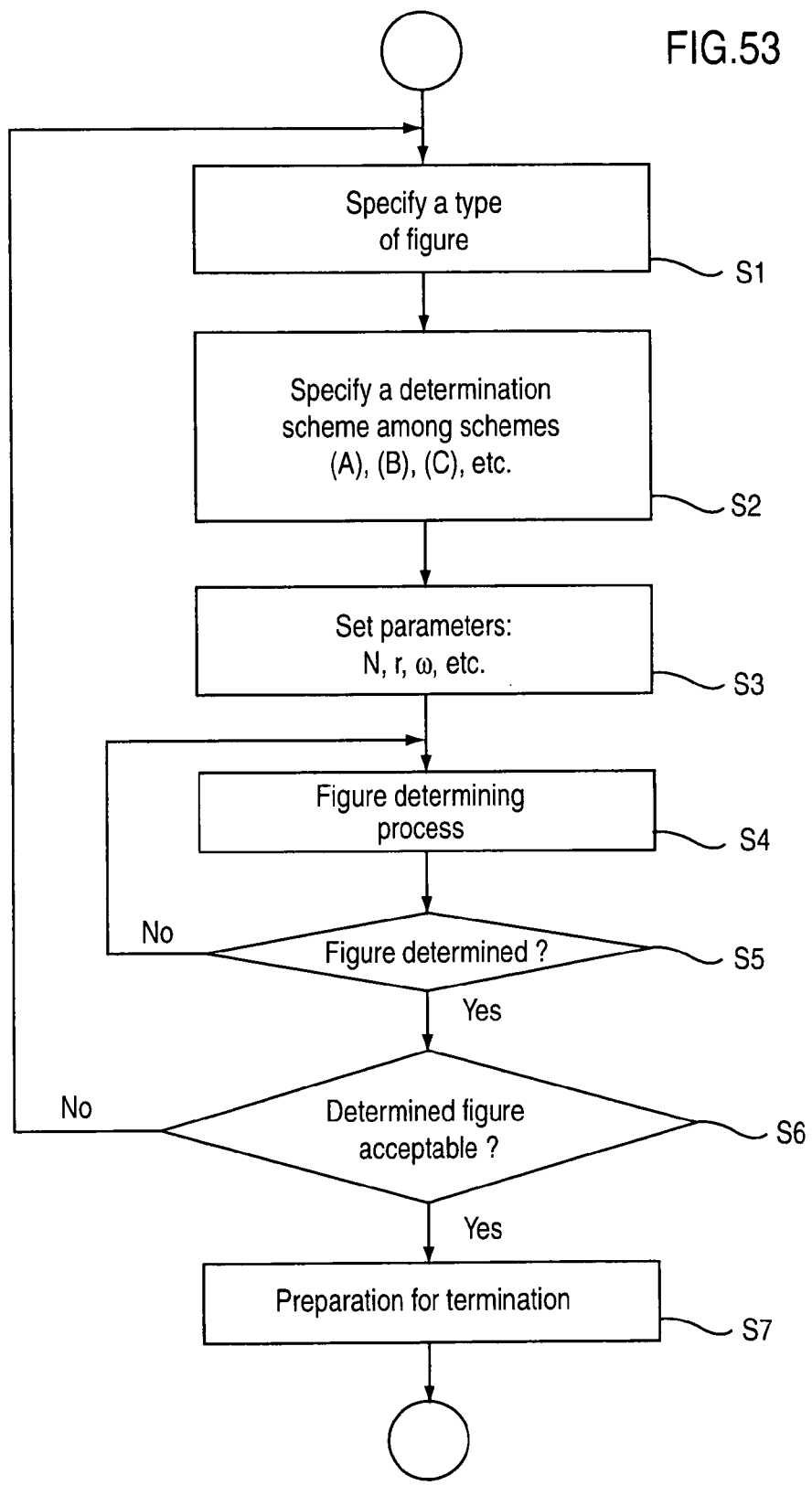
FIG. 53 is a flowchart showing the control operation of the embodiment shown in FIG. 52.

It should be noted that the phrase "preparation for termination" used for the step S7 in FIG. 53 signifies that the process by the figure determination system 100 completes after the intended process for the determined figure, such as the conversion of figure into data or the transfer of figure to a machine controller, has ended, and the system 100 is brought to a termination.

Although specific embodiments have been described and illustrated, these embodiments do not limit the technical scope of the present invention. For example, although the above-mentioned embodiments are mainly of the determination of equilateral quadrilateral or equilateral pentagonal figures, the present invention is applicable extensively to the determination of arbitrary regular N-polygonal figures.

EFFECT OF THE INVENTION

According to the present invention as mentioned above, it becomes possible to fulfill the demand of boring of boring holes with regular N-polygonal shapes which has not been possible in the past, and yet the inventive technique can readily be put into practice. The present invention is not only useful for the boring of foundations, but is applicable to the boring of rocks and other sites.

What is claimed is:

1. A method for determining a regular N-polygonal figure for a boring hole having vertexes of N in number, characterized in that:
   a regular (N−1)-polygonal figure revolves along a circle, which circle is concentric to the center of a regular N-polygonal figure to be determined and has a radius r, and rotates at an angular velocity $\omega$;
   a contour of the said regular (N−1)-polygonal figure is inscribed on a circle having a radius $(N-1)^2$ r;
   the regular (N−1)-polygonal figure revolves at an angular velocity $(1-N)\omega$; and
   an area being swept by the said regular (N−1)-polygonal figure defines a regular N-polygonal figure to be determined, which figure is circumscribed on a circle having a radius N(N−2)r; and
   boring a hole having a shape defined by the the regular N-polygonal figure:
   the contour of the regular N-polygonal figure can be defined by a function $f(\theta)$;
   the function $f(\theta)$ is a one-valued function;
   the function $f(\theta)$ is a periodic function with a period $2\pi/N$;
   the function $f(\theta)$ has one maximum value and one minimum value in one period,
   the function $f(\theta)$ has line symmetry with respect to the center of the minimum point between the two maximum points, in regard to one period from a maximum point to the next maximum point of the function $f(\theta)$; and
   the function $f(\theta)$ has a positive curvature or no curvature.

2. A method for determining a regular N-polygonal figure for a boring hole having vertexes of N in number, characterized in that:
   a regular (N+1)-polygonal figure revolves along a circle, which circle is concentric to the center of a regular N-polygonal figure to be determined and has a radius r, and rotates at an angular velocity $\omega$;
   a contour of the said regular (N+1)-polygonal figure is inscribed on a circle having a radius $(N+1)^2$ r;
   the regular (N+1)-polygonal figure revolves at an angular velocity $(N+1)\omega$;
   an area being swept by the said regular (N+1)-polygonal figure defines a regular N-polygonal figure to be determined, which figure is circumscribed on a circle having a radius N(N+2)r; and
   boring a hole having a shape defined by the regular N-polygonal figure:
   the contour of the regular N-polygonal figure can be defined by a function $f(\theta)$;
   the function $f(\theta)$ is a one-valued function;
   the function $f(\theta)$ is a periodic function with a period $2\pi/N$;
   the function $f(\theta)$ has one maximum value and one minimum value in one period,
   the function $f(\theta)$ has line symmetry with respect to the center of the minimum point between the two maximum points, in regard to one period from a maximum point to the next maximum point of the function $f(\theta)$; and
   the function $f(\theta)$ has a positive curvature or no curvature.

3. An apparatus for determining a regular N-polygonal figure for a boring hole having vertexes of N in number, characterized in that the said apparatus includes an input means and a control means,
   the said input means is constructed to carry out functions for:
   inputting so as to revolve a regular (N−1)-polygonal figure along a circle, which circle is concentric to the center of a regular N-polygonal figure to be determined and has a radius r;
   inputting so as to rotate such the regular (N−1)-polygonal figure at an angular velocity $\omega$;
   setting the regular (N−1)-polygonal figure so as to define a contour which is inscribed on a circle having a radius $(N-1)^2$r; and
   setting an angular velocity $(1-N)\omega$ at which the regular (N−1)-polygonal figure revolves: and that
   the said control means is constructed to carry out a function for defining a regular N-polygonal figure to be determined, which is circumscribed on a circle having a radius N(N−2)r, by an area being swept by the regular (N−1)-polygonal figure; and
   boring a hole having a shape defined by the regular N-polygonal figure:
   a contour of the regular N-polygonal figure can be defined by a function $f(\theta)$;
   the function $f(\theta)$ is a one-valued function;
   the function $f(\theta)$ is a periodic function with a period $2\pi/N$;
   the function $f(\theta)$ has one maximum value and one minimum value in one period,
   the function $f(\theta)$ has line symmetry with respect to the center of the minimum point between the two maximum points, in regard to one period from a maximum point to the next maximum point of the function $f(\theta)$; and
   the function $f(\theta)$ has a positive curvature or no curvature.

4. An apparatus for determining a regular N-polygonal figure for a boring hole having vertexes of N in number, characterized in that the said apparatus includes an input means and a control means,
   the said input means is constructed to carry out functions for:
   inputting so as to revolve a regular (N+1)-polygonal figure along a circle, which circle is concentric to the center of a regular N-polygonal figure to be determined and has a radius r;
   inputting so as to rotate such the regular (N+1)-polygonal figure at an angular velocity $\omega$;
   setting the regular (N+1)-polygonal figure so as to define a contour which is inscribed on a circle having a radius $(N+1)^2$r, and
   setting an angular velocity $(N+1)\omega$ at which the regular (N+1)-polygonal figure revolves: and that
   the said control means is constructed to carry out a function for defining a regular N-polygonal figure to be determined, which is circumscribed on a circle having a radius N(N+2)r, by an area being swept by the regular (N+1)-polygonal figure; and
   boring a hole having a shape defined by the regular N-polygonal figure:
   the contour of the regular N-polygonal figure can he defined by a function $f(\theta)$;
   function $f(\theta)$ is a one-valued function;
   function $f(\theta)$ is a periodic ftmction with a period $2\pi/N$.
   function $f(\theta)$ has one maximum value and one minimvm value in one period,
   function $f(\theta)$ has line symmetry with respect to the center of the minimum point between the two maximum points in regard to one period from a maximum point to the next maximum point of the function $f(\theta)$ and
   the function $f(\theta)$ has a positive curvature or no curvature.

* * * * *